United States Patent [19]

Nishikawa et al.

[11] Patent Number: 4,700,819

[45] Date of Patent: Oct. 20, 1987

[54] METHOD OF CONTROLLING TRANSMISSION CAPACITY OF A DIRECT-COUPLING MECHANISM IN HYDRAULIC POWER TRANSMISSION MEANS OF AN AUTOMATIC TRANSMISSION FOR AUTOMOTIVE VEHICLES IN ACCORDANCE WITH VEHICLE OPERATION MODE

[75] Inventors: Masao Nishikawa, Nerima; Junichi Miyake, Iruma; Yoshimi Sakurai, Tanashi; Yukihiro Fukuda, Asaka, all of Japan

[73] Assignee: Honda Giken Kogyo Kabushiki Kaisha, Tokyo, Japan

[21] Appl. No.: 872,969

[22] Filed: Jun. 11, 1986

[30] Foreign Application Priority Data

Jun. 13, 1985 [JP] Japan .................................. 60-129524
Mar. 3, 1986 [JP] Japan .................................. 61-46976

[51] Int. Cl.⁴ ........................ F16D 31/08; B60K 41/22
[52] U.S. Cl. .................................. 192/3.62; 192/3.31; 192/3.58; 74/731; 361/242
[58] Field of Search ................. 74/645, 733, 732, 731, 74/730; 192/3.58, 3.31, 0.032, 3.62, 3.61, 103 R; 361/242

[56] References Cited

U.S. PATENT DOCUMENTS

| 4,386,687 | 7/1983 | Chevalier et al. | 192/0.033 X |
| 4,535,652 | 8/1985 | Nishikawa et al. | 192/3.58 X |
| 4,577,737 | 3/1986 | Niikura et al. | 192/3.31 |
| 4,582,185 | 4/1986 | Grimes et al. | 192/3.31 X |

Primary Examiner—George H. Krizmanich
Attorney, Agent, or Firm—Lyon & Lyon

[57] ABSTRACT

A method of controlling a direct-coupling mechanism of a hydraulic torque converter of an automatic transmission for an automotive vehicle, wherein the transmission capacity of the direct-coupling mechanism is controlled such that the value of a first predetermined parameter indicative of an amount of relative slip between input and output members of the hydraulic torque converter which are mechanically engaged with each other by the direct-coupling mechanism lies within a predetermined reference range. The value of a second predetermined parameter indicative of one of said plurality operating modes for the automotive vehicle is detected. Determined in dependence on the detected value of the second predetermined parameter is either the predetermined reference range of the value of the first predetermined parameter or a rate at which the transmission capacity is controlled such that the value of said predetermined parameter changes toward the predetermined reference range of the first predetermined parameter.

12 Claims, 22 Drawing Figures

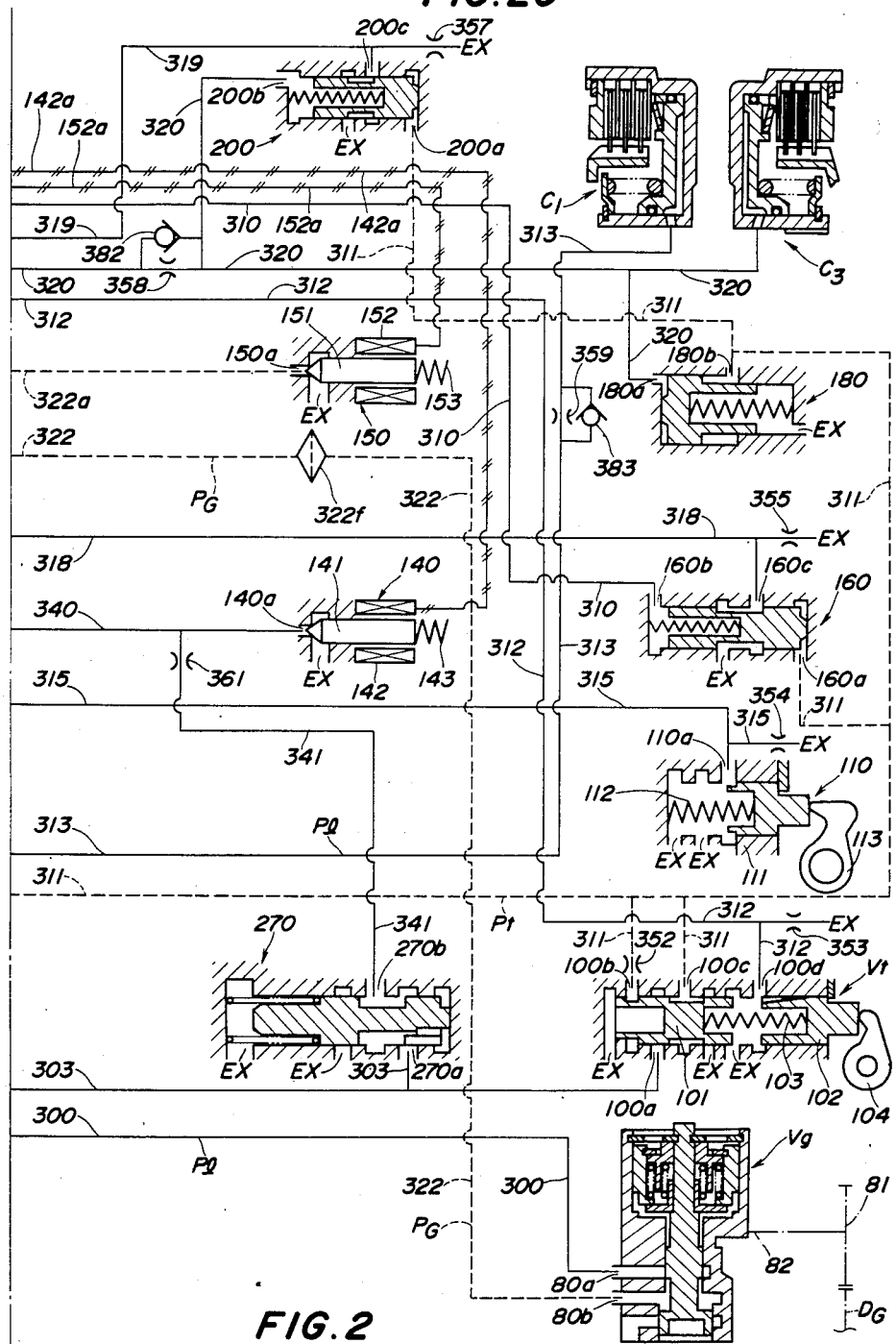

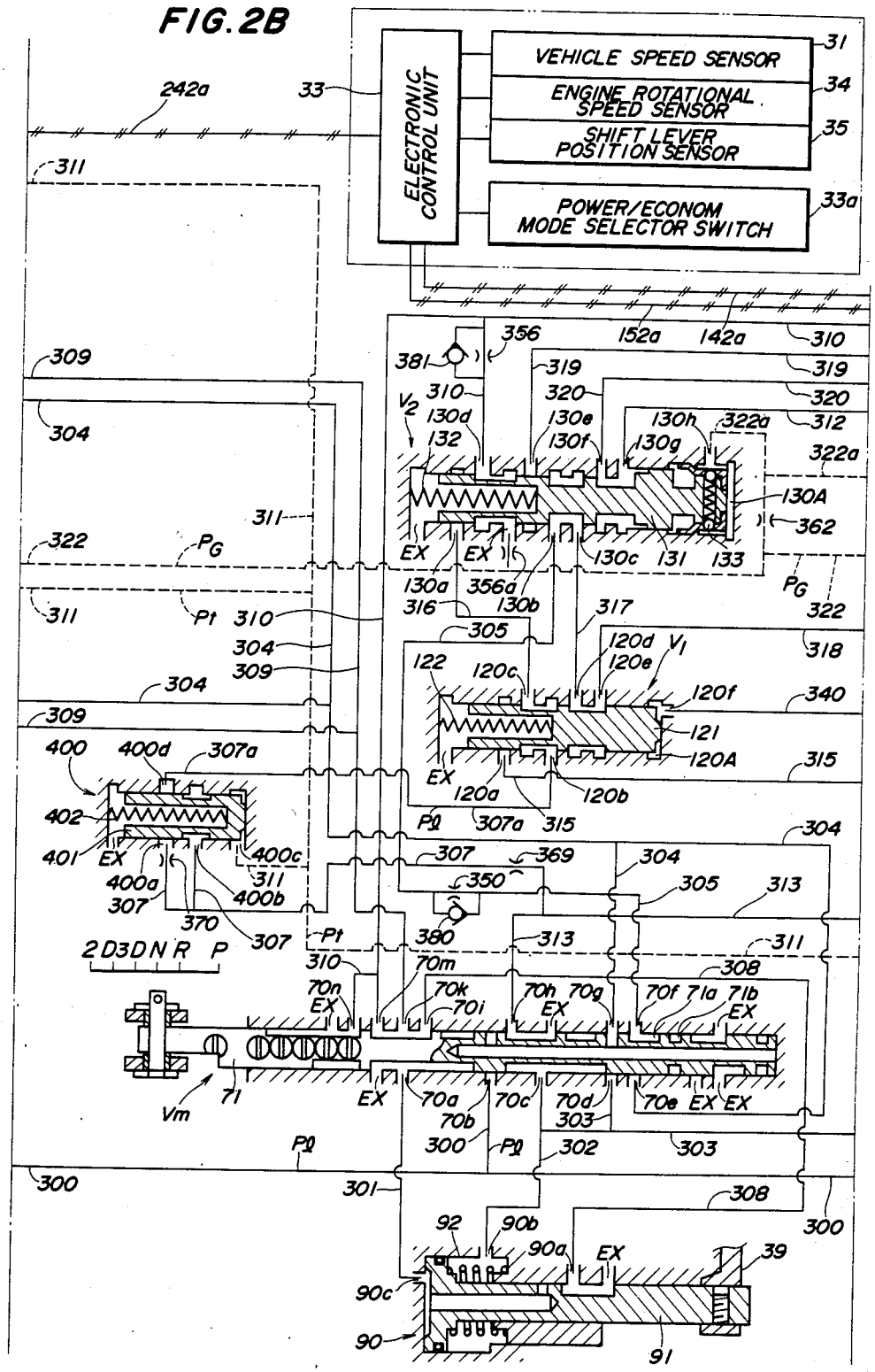

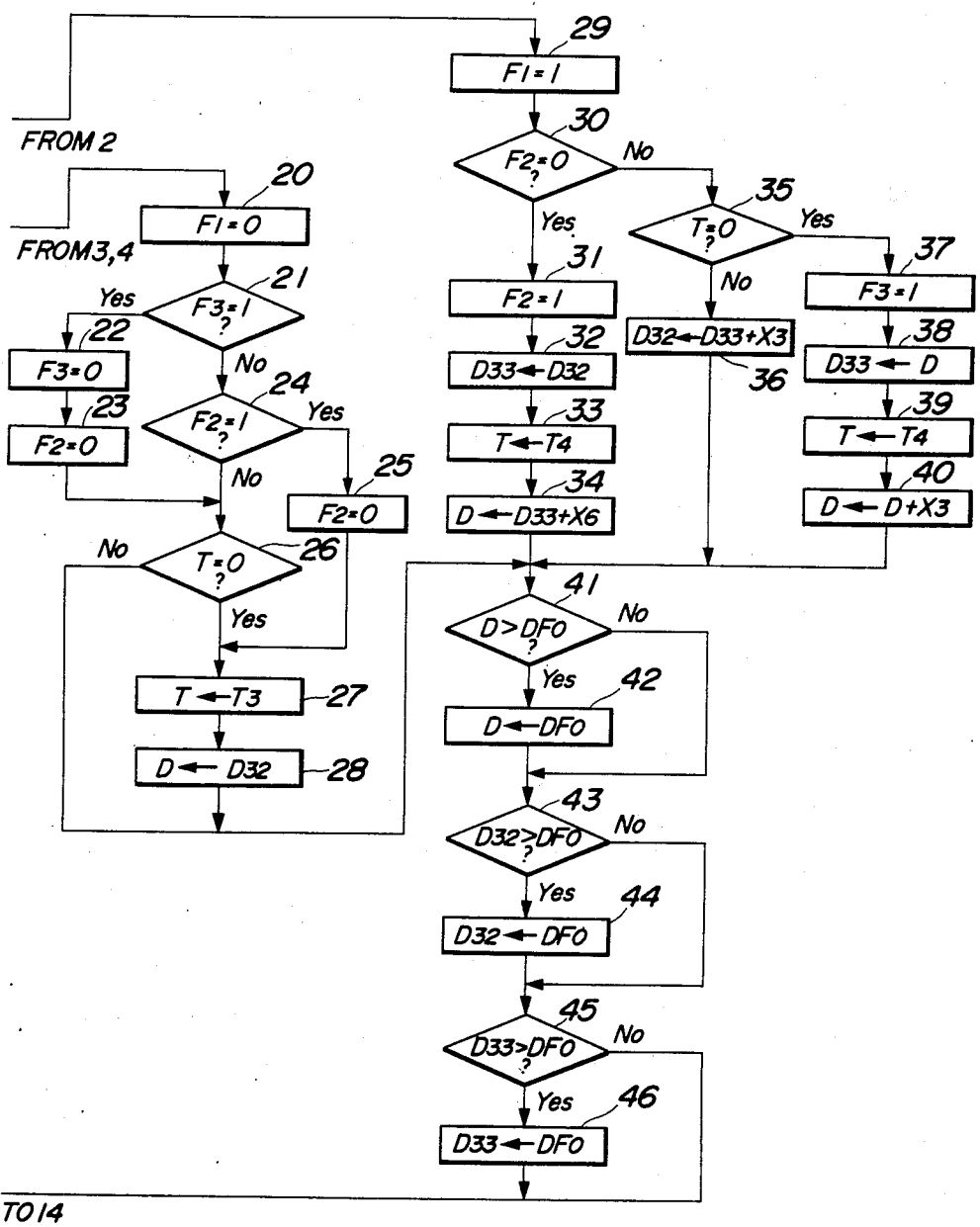

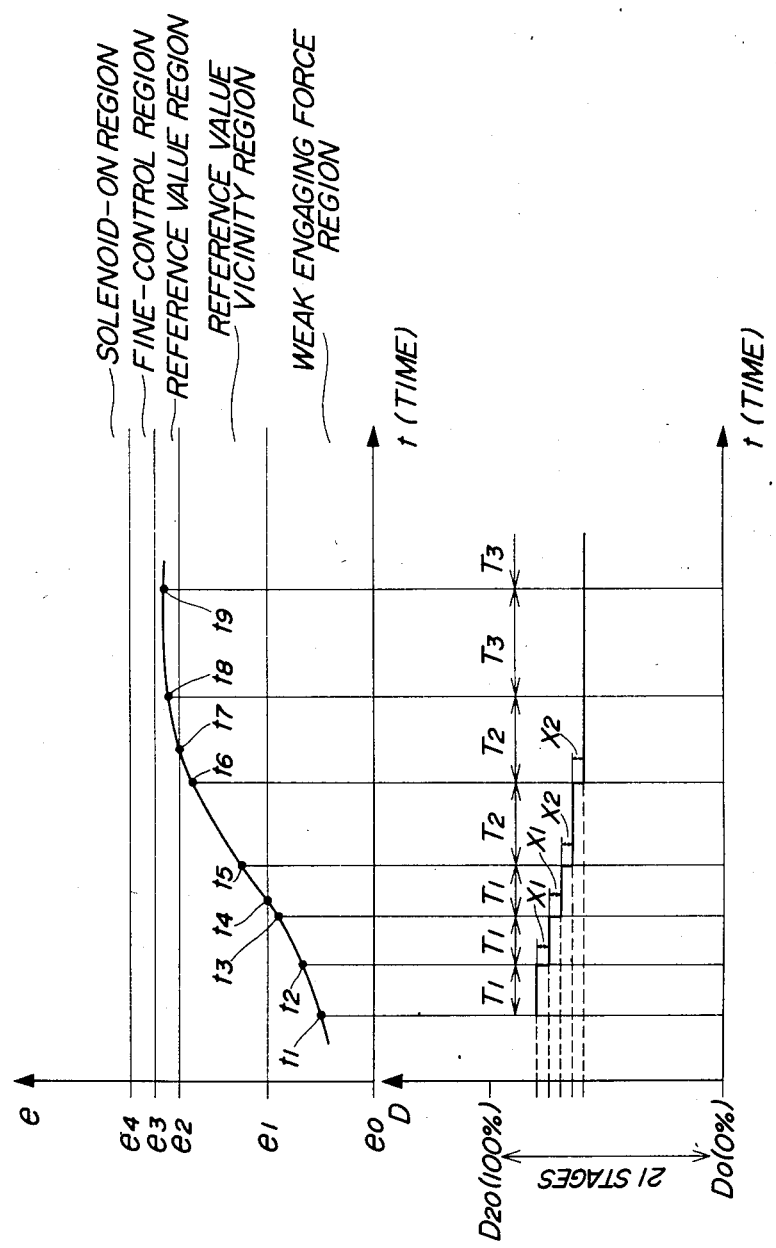

| FIG.10(a) | FIG.10(b) |

(a)

| FIG.11(a) | FIG.11(b) |

(a)

METHOD OF CONTROLLING TRANSMISSION CAPACITY OF A DIRECT-COUPLING MECHANISM IN HYDRAULIC POWER TRANSMISSION MEANS OF AN AUTOMATIC TRANSMISSION FOR AUTOMOTIVE VEHICLES IN ACCORDANCE WITH VEHICLE OPERATION MODE

BACKGROUND OF THE INVENTION

This invention relates to a control method for a direct-coupling mechanism in a hydraulic power transmission means of an automatic transmission for automotive vehicles, and more particularly to a control method of controlling the transmission capacity of a direct-coupling mechanism which has input and output members mechanically engageable with each other.

In an automatic vehicle equipped with a hydraulic power transmission means as an automatic transmission, such as a hydraulic torque converter and a hydraulic coupling (hereinafter merely called "the torque converter") in general, the torque converter can provide due to its torque amplifying function a required driving force and a smooth and easy driving feeling over the whole speed region of the vehicle, even with a small number of speed reduction gears provided in the transmission. However, slippage loss inherent in the torque converter can cause degradation in the effective consumption of fuel and an increase in the engine rotational speed by an amount corresponding to the slippage loss, the latter resulting in larger operating noise of the engine.

To avoid this disadvantage, a direct-coupling or locking-up mechanism has been developed and actually brought into use which is adapted to mechanically couple the input and output members of the torque converter together to allow mechanical transmission of all or part of the engine power to the vehicle when the hydraulic power transmission by the torque converter is not necessary.

In order to make best use of the direct-coupling mechanism to improve the power transmission efficiecy and the effective fuel consumption, it has been desired to expand the vehicle speed region wherein the direct-coupling mechanism is operated to a lowest possible value. However, if the mechanical direct-coupling is effected in a low vehicle speed region where also the engine speed is low, it can easily cause large vibrations of the vehicle body as well as large vibration noise due to fluctuations of the engine torque, and also causes a degradation in the driveability.

One way to overcome the above disadvantage would be to control the transmission capacity of the direct-coupling mechanism to vary so as to allow slippage in the direct-coupling mechanism when there occurs certain peak torque fluctuations during operation of the engine in the low vehicle speed region, instead of fully directly coupling the the torque converter. For example, the transmission capacity of the direct-coupling mechanism is variably controlled to an optimum value selected from a plurality of values of the transmission capacity (engaging force) in response to the calculated rotational speed ratio e or slip ratio $(1-e)$ between the input and output members of the torque converter, which are used as feedback values to prevent the rotational speed ratio e from becoming 1 or the slip ratio from becoming 0 in the low vehicle speed region.

However, in incorporating the above method into an actual system, the following problem occurs. For instance, in an embodiment of the invention described later, if the maximum transmission capacity of the direct-coupling mechanism that can be attained by the control system is set at a relatively small value, the control will be smoothly conducted and vibrations and noise of the vehicle body will be mitigated, but at the same time fuel consumption will be increased. If, on the other hand, the maximum transmission capacity is set at a relatively high value, the rotational speed ratio e will sometimes become almost 1, or the slip ratio will approach 0, or the speed ratio e can assume the value 1 momentarily or the slip ratio can assume the value 0 momentarily, whereby the vehicle body vibrates and generates noise.

This is because even by today's electronic control technology the time required to calculate the rotational speed ratio e or the slip ratio, inclusive of the sampling time, is not negligibly short as yet, and also mechanical parts in the feedback control system such as hydraulic devices pose a physical limitation upon the reduction of the response time of the system. Therefore, if the transmission capacity is set at a relatively high value, whereby the speed at which the direct-coupling mechanism is operated toward the direct-coupling position (the speed at which the transmission capacity increases) increases, the control cannot catch up with the speed and, as a result, the rotational speed ratio e or the slip ratio can exceed the upper limit of the respective reference value whereupon the feedback control system now operates to control the transmission capacity so as to decrease, and accordingly the speed ratio e or the slip ratio is caused to decrease below the reference value. When this is repeated, it results in hunting of the torque converter.

Also, it is desirable from the view points of fuel consumption and power transmission efficiency that the driver can select at his will either fuel consumption priority operation mode or output power priority operation and the transmission capacity of the direct-coupling mechanism is controlled in a manner suited to the selected operation mode.

SUMMARY OF THE INVENTION

It is the object of the invention to provide a control method for a direct-coupling mechanism of power transmission means of an automatic transmission for automotive vehicles, which is capable of controlling the capacity transmission so as to curtail the fuel consumption or improve the power transmission characteristic in accordance with an operation mode in which the vehicle is operating.

According to a first aspect of the invention, the present invention provides a method of controlling a direct-coupling mechanism of hydraulic power transmission means having an input member and an output member, of an automatic transmission for an automotive vehicle, the direct-coupling mechanism being operable to mechanically engage and disengage the input member and the output member with and from each other, the automatic transmission having selector means being operatable at human will to select among a plurality of operating modes in which the automotive vehicle is to be operated, wherein the transmission capacity of the direct-coupling mechanism is controlled such that the value of a first predetermined parameter indicative of an amount of relative slip between the input member and the output member lies within a predetermined reference range.

The method according to the first aspect of the invention is characterized by comprising the following steps: (1) detecting the value of a second predetermined parameter indicative of one of the operating modes selected by the selector means; and (2) determining the predetermined reference range of the value of the first predetermined parameter in dependence on the detected value of the second predetermined parameter.

Preferably, the selector means comprises a two-position selecting means adapted to selectively assume a first position and a second position and produce a signal indicative of one of the first and second positions assumed as the value of the second predetermined parameter. Advantageously, the predetermined reference range of the value of the first predetermined parameter is set to a range corresponding to a smaller amount of relative slip between the input member and the output member when the first position is assumed than when the second position is assumed.

Alternatively, the selector means comprises a manual shift valve for selectively assuming a plurality of shift positions each determining a respective range of reduction ratio that can be established by speed change gears of the automatic transmission and producing a signal indicative of one of the shift positions assumed as the value of the second predetermined parameter. In the alternative embodiment, the predetermined reference range of the value of the first predetermined parameter is set to a range corresponding to a smaller amount of relative slip between the input member and the output member when a higher speed range shift position is assumed as one of the shift positions than when a lower speed range shift position is assumed.

According to a second aspect of the invention, the present invention provides a method of controlling a direct-coupling mechanism of hydraulic power transmission means having an input member and an output member, of an automatic transmission for an automotive vehicle, the direct-coupling mechanism being operable to mechanically engage and disengage the input member and the output member with and from each other, the automotive vehicle being adapted to operate in a plurality of operating modes, wherein the transmission capacity of the direct-coupling mechanism is controlled such that the value of a predetermined parameter indicative of an amount of relative slip between the input member and the output member lies within a predetermined reference range.

The method according to the second aspect of the invention is characterized by comprising the following steps: (1) detecting the value of a second predetermined parameter indicative of one of the operating modes in which the automotive vehicle is operating; and (2) determining a rate at which the transmission capacity is controlled such that the value of the first predetermined parameter changes toward the predetermined reference range, in dependence on the detected value of the second predetermined parameter.

Preferably, the second predetermined parameter is indicative of a plurality of shift positions each determining a respective speed reduction ratio established by the speed change gears of the automatic transmission. Alternatively, the second predetermined parameter is indicative of a plurality of shift positions each determining a respective range of reduction ratio that can be established by the speed change gears.

Preferably, in either of the first and second aspects of the invention, the first predetermined parameter is the ratio in rotational speed between the input member and the output member. Alternatively, the first predetermined parameter may be the difference in rotational speed between the input member and the output member.

The above and other objects, features and advantages of the invention will be more apparent from the ensuing detailed description taken in conjunction with the accompanying drawings.

BRIEF DESCRIPTION OF THE DRAWINGS

FIG. 2B is a circuit diagram illustrating a second portion of a hydraulic control system employed in the automatic transmission shown in FIG. 1;

FIG. 2C is a circuit diagram illustrating a third portion of a hydraulic control system employed in the automatic transmission shown in FIG. 1;

FIG. 2 is a schematic diagram illustrating how FIGS. 2A, 2B and 2C are arranged to show the entire hydraulic control system employed in the automatic transmission shown in FIG. 1;

FIGS. 7A and 7B are sub-flow charts illustrating the control procedure effected in Step 17 in FIG. 6;

FIG. 7 is a schematic diagram showing how FIGS. 7A and 7B are arranged to form the entire sub-flow chart;

FIG. 8 is a graph showing a relationship between the rotational speed ratio and the duty ratio in the case where the rotational speed ratio e increases from the weak engaging force region through the reference value vicinity region and enters the reference value region, during which the duty ratio correction value is unchanged and the timer period is changed;

FIGS. 10a and 10b are graphs showing a relationship between the rotational speed ratio and the duty ratio in the case where the rotational speed ratio e increases from the reference value region and enters the fine-control region, supradjacent the reference value region, and then returns to the reference value region, without entering the higher solenoid-on region;

FIGS. 10a and 10b are linked together to form the entire graph; and FIGS. 11a and 11b are graphs showing a relationship between the rotational speed ratio and the duty ratio in the case where the rotational speed ratio e increases from the reference value region through the fine-control region and enters the solenoid-on region, and then returns to the reference value region.

DETAILED DESCRIPTION

The invention will now be described in detail with reference to the drawings illustrating embodiments thereof.

Figure 1:
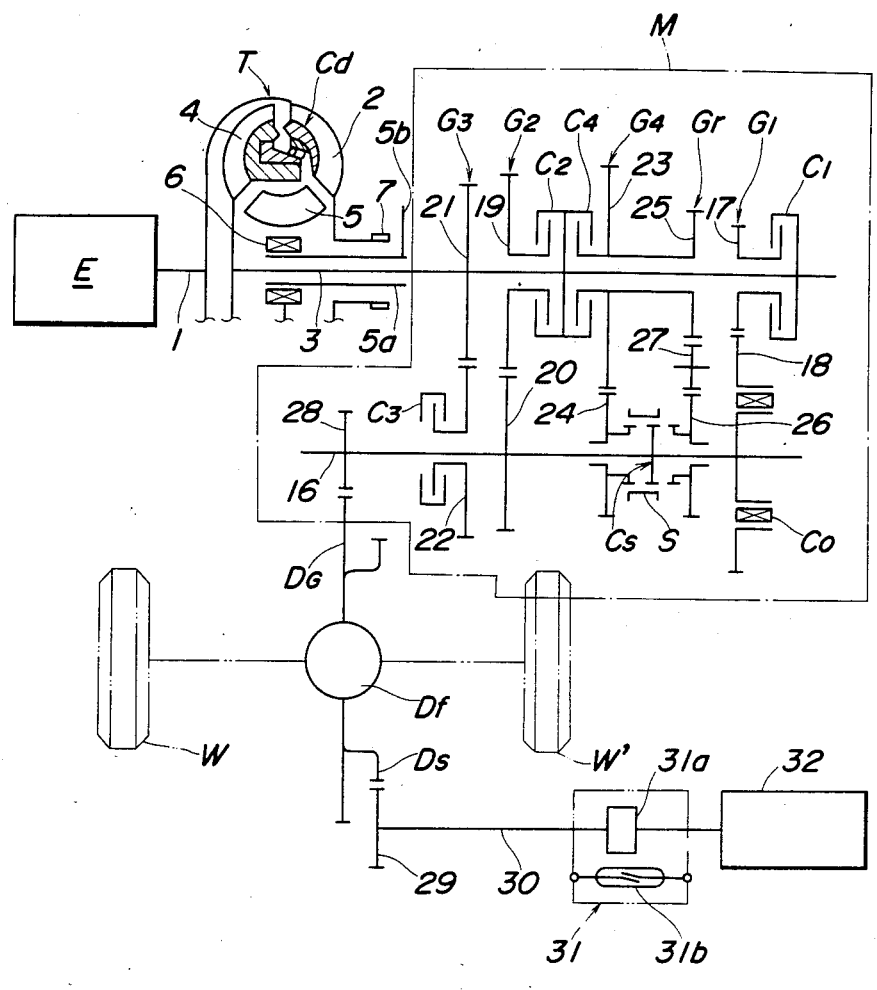
FIG. 1 is a schematic view of an automatic transmission, to which is applied the method of controlling a direct-coupling mechanism according to the invention is applicable.

Referring first to FIG. 1, there is schematically illustrated an automatice transmission for automotive vehicles, to which the invention is applied. Output from an engine E is transmitted to left and right driving wheels W and W' through a crankshaft 1 of the engine, a hydraulic torque conveter T serving as a hydraulic power transmission, an auxiliary transmission M, and a differential Df in the mentioned order.

The hydraulic torque converter T comprises a pump 2 coupled to the crankshaft 1, a turbine 4 coupled to an input shaft 3 of the auxiliary transmission M, and a stator 5 coupled, via a one-way clutch 6, to a stator shaft 5a which in turn is supported on the input shaft 3 for rotation relative thereto. Torque is transmitted from the crank shaft 1 to the pump 2, and then to the turbine 4 in a hydrodynamic manner. When amplification of torque takes place while torque is transmitted from the pump 2 to the turbine 4, the resulting reaction force is borne by the stator 5, as is already known.

Figure 2A:
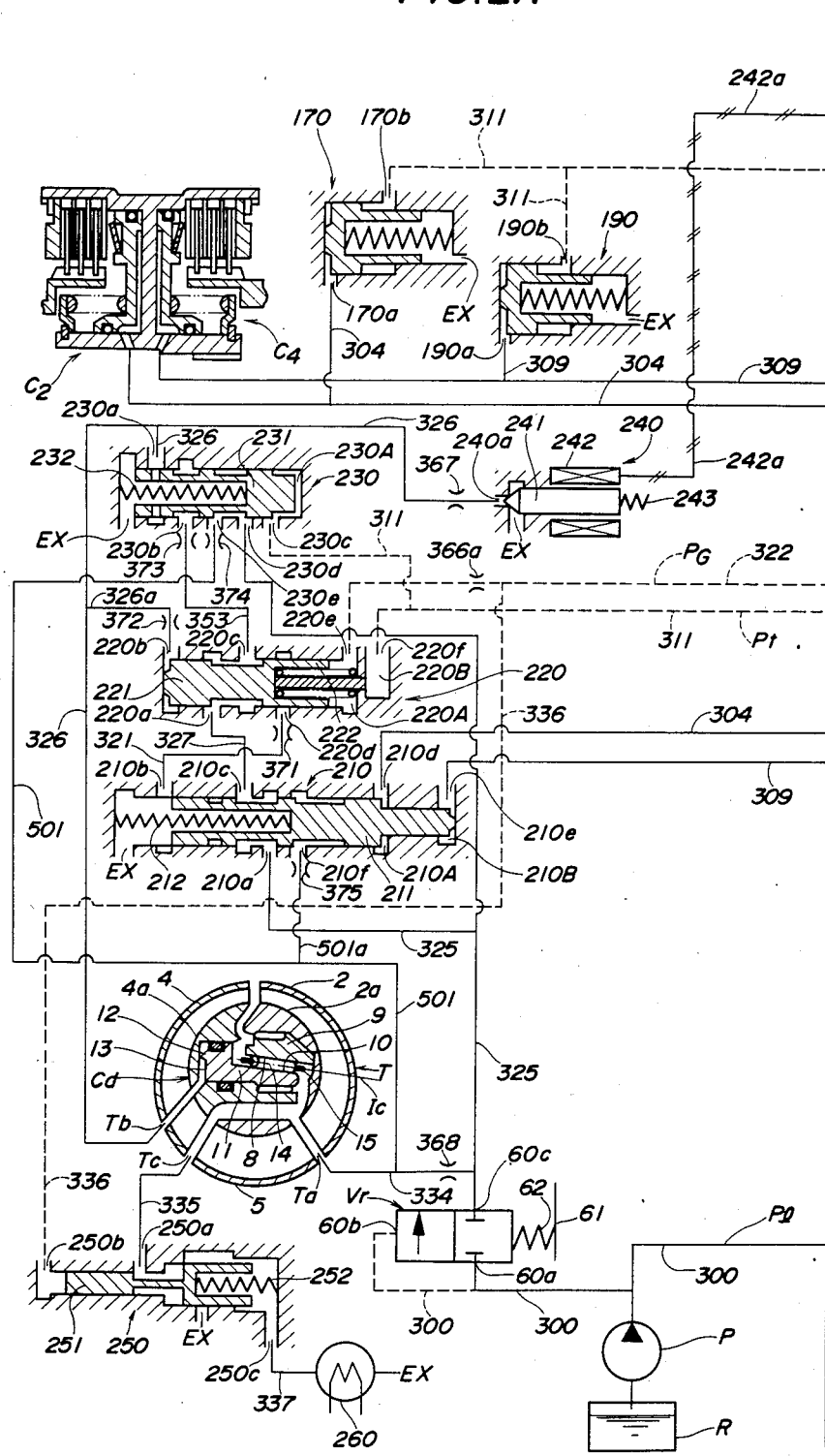
FIG. 2A is a circuit diagram illustrating a portion of a hydraulic control system employed in the automatic transmission shown in FIG. 1.

A pump driving gear 7 is arranged on a right end of the pump 2 as viewed in FIG. 1, for driving an oil hydraulic pump P appearing in FIG. 2. A stator arm 5b is secured to a right end of the stator shaft 5a for controlling a regulator valve Vr appearing in FIG. 2.

Figure 3:
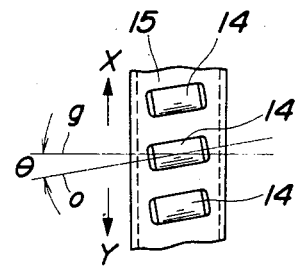
FIG. 3 is a development of essential part of the direct-coupling clutch appearing in FIG. 2.

A direct-coupling clutch Cd, which is a roller clutch type, is interposed between the pump 2 and the turbine 4 for mechanically coupling them with each other. Referring now to FIGS. 2 and 3 showing in further detail the direct-coupling clutch Cd, an annular driving member 9 having a driving conical surface 8 at its inner periphery is spline-fitted in an inner peripheral wall 2a of the pump 2, whereas an annular driven member 11, which has a driven conical surface 10 at its outer periphery extending parallel with the driving conical surface 8, is slidably spline-fitted in an inner peripheral wall 4a of the turbine 4 for axial movement relative thereto. The driven member 11 has its one end formed integrally with a piston 12 slidably received within an oil hydraulic cylinder 13 formed in the inner peripheral wall 4a of the turbine 4. The piston 12 receives a pressure in the cylinder 13 and a pressure in the torque converter T at the same time, respectively, at its both or left and right end faces.

Cylindrical clutch rollers 14 are interposed between the driving and driven conical surfaces 8, 10 and retained in place by an annular retainer 15 in a manner such that, as shown in FIG. 3, the clutch rollers 14 each have its axis o inclined by a predetermined angle $\theta$ relative to the generating line g of a virtual conical surface Ic, shown in FIG. 2, which extends between the conical surfaces 8, 10 along the middle thereof.

When the torque converter T is not required to amplify the torque transmitted thereto, an oil pressure which is higher than the internal pressure of the torque converter T is supplied to the cylinder 13 to cause the piston 12, i.e. the driven member 11, to move toward the driving member 9, whereby the clutch rollers 14 are urgedly held between the conical surfaces 8, 10. With the clutch rollers 14 thus urgedly held between the conical surfaces 8, 10, if output torque from the engine E causes rotation of the driving member 9 in the direction indicated by the arrow X in FIG. 3 relative to the driven member 11, the clutch rollers 14 rotate about their own axes to provide relative axial displacement of the members 9, 11 in a direction such that the members 9, 11 approach toward each other, since the axis o of each clutch rollers 14 is inclined relative to the generating line g, as hereinbefore described. Consequently, the clutch rollers 14 bitingly engage with the conical surfaces 8, 10 to establish mechanical coupling between the members 9, 11, i.e. the pump 2 and the turbine 4 of the torque converter T. Even on this occasion, if engine output torque exceeding the mechanical coupling force of the direct-coupling clutch Cd is applied between the pump 2 and the turbine 4, the clutch rollers 14 can slip on the conical surfaces 8, 10 to divide the engine output torque into two parts, wherein part fo the torque is mechanically transmitted through the direct-coupling clutch Cd while the remaining torque is hydrodynamically transmitted from the pump 2 to the turbine 4. Therefore, the ratio between the mechanically transmitted torque and the hydrodynamically transmitted torque is variable dependent on the degree of slipping of the clutch rollers 14.

On the other hand, if a reverse load is applied to the torque converter T during operation of the direct-coupling clutch Cd, the rotational speed of the driven member 11 becomes larger than that of the driving member 9, that is, the driving member 9 rotates in the direction indicated by the arrow Y in FIG. 3 relative to the driven member 11. Consequently, the clutch rollers 14 rotate in a direction reverse to that mentioned above, to cause relative axial displacement of the members 9, 11 in a direction of moving the same members 9, 11 away from each other. Thus, the clutch rollers 14 are released from biting engagement with the conical surfaces 8, 10 to run idle so that the reverse load is transmitted from the turbine 4 to the pump 2 only in a hydrodynamic manner.

As the oil hydraulic cylinder 13 is released from the oil pressure, the piston 12 is displaced to its initial position by the internal pressure of the torque converter T acting thereupon, thereby rendering the direct-coupling clutch Cd inoperative.

Referring again to FIG. 1, the auxiliary transmission M has an output shaft 16 extending parallel with the input shaft 3, and is provided with a first-speed gear train G1, a second-speed gear train G2, a third-speed gear train G3, a fourth-speed gear train G4, and a reverse gear train Gr, all arranged in juxtaposition between the input and output shafts 3, 16. The first-speed gear train G1 comprises a driving gear 17 connectible to the input shaft 3 through 1 first-speed clutch C1, and a driven gear 18 connectible to the output shaft 16 through a one-way clutch C0 and engaging with the driving gear 17. The second-speed gear train G2 comprises a driving gear 19 connectible to the input shaft 3 through a second-speed clutch C2, and a driven gear 20 secured to the output shaft 16 and engaging with the driving gear 19, while the third-speed gear train G3 comprises a driving gear 21 secured to the input shaft 3, and a driven gear 22 connectible to the output shaft 16 through a third-speed clutch C3 and engaging with the driving gear 21. The fourth-speed gear train G4 comprises a driving gear 23 connectible to the input shaft 3 through a fourth-speed clutch C4, and a driven gear 24 connectible to the output shaft 16 through a selector clutch Cs and engaging with the driving gear 23. On the other hand, the reverse gear train Gr comprises a driving gear 25 formed integrally with the driving gear 23 of the fourth-speed gear train G4, a driven gear 26 connectible to the output shaft 16 through the selector clutch Cs, and an idle gear 27 engaging with the gears 25, 26. The selector clutch Cs is arranged between the driven gears 24 and 26 of the fourth-speed gear train G4, and has a selector sleeve S which is shiftable between a left or forward position and a right or reverse position as viewed in FIG. 1, to selectively connect the driven gear 24 or the driven gear 26 to the output shaft 16. The one-way clutch C0 permits the driving torque from the engine E alone to be transmitted to the driving wheels W, W', while prohibiting transmission of torque from the driving wheels W, W' to the engine E.

If the first-speed clutch C1 alone is engaged while the selector sleeve S is held in the forward position as illustrated in FIG. 1, the driving gear 17 is connected to the input shaft 3 to establish the first-speed gear train G1, thereby allowing transmission of torque from the input shaft 3 to the output shaft 16 therethrough. Then, if the second-speed clutch C2 is engaged with the first-speed clutch C1 maintained in its engaged state, the driving gear 19 is connected to the input shaft 3 to establish the second-speed gear train G2 through which torque can be transmitted from the input shaft 3 to the output shaft 16. That is, even while the first-speed clutch C1 is engaged, the second-speed gear train G2, the third-speed gear train G3 or the fourth-speed gear train G4 can be established by the action of the one-way clutch C0, redering the first-speed gear train G1 substantially inoperative. If the second-speed clutch C2 is disengaged and the third-speed clutch C3 is engaged instead, the driven gear 22 is connected to the output shaft 16 to establish the third-speed gear train G3, while if the third-speed clutch C3 is disengaged and the fourth-speed clutch C4 is engaged instead, the driving gear 23 is connected to the input shaft 3 to thereby establish the fourth-speed gear train G4. On the other hand, if the fourth-speed clutch C4 alone is engaged while the selector sleeve S of the selector clutch Cs is shifted to the right or reverse position, as viewed in FIG. 1, the driving gear 25 and the driven gear 26 are connected, respectively, to the input shaft 3 and the output shaft 16 to establish the reverse gear train Gr, thereby allowing transmission of torque from the input shaft 3 to the output shaft 16 through the reverse gear train Gr.

The torque transmitted to the output shaft 16 is then transmitted through an output gear 28 mounted on one end of the output shaft 16 to an enlarged gear DG of the differential Df.

A gear Ds is secured to the enlarged gear DG of the differential Df and engages with a gear 29, and a speedometer cable 30 has one end secured to the gear 29 and the other end to a speedometer 32 of the vehicle via a magnet 31a of the vehicle speed sensor 31, respectively. The magnet 31a is mounted on the speedometer calbe 30. The speedometer 32 is thus driven through the gears Ds, 29 and the speedometer calbe 30 to indicate the speed of the vehicle, while the vehicle speed sensor 31 comprises the aforementioned magnet 31a, and a reed switch 31b driven by the magnet 31a, for instance, rotation of the magnet 31a in unison with the speedometer cable 30 causes alternate closing and opening of the reed switch 31b, and an on-off signal indicative of closing and opening of the reed switch 31b is supplied to an electronic control system 33 hereinafter referred to.

FIG. 2 shows a hydraulic control circuit incorporating the electronic control system of the automatic transmission according to the invention.

Referring to FIG. 2, the oil hydraulic pump P is connected through a fluid line 300 to an inlet port 60a, a pilot pressure introducing port 60b of a control valve Vr, as well as to a port 70b of a manual shift valve (hereinafter referred to as "the manual valve") Vm, and an inlet port 80a of the governor valve Vg. Ports 70a and 70c of the manual valve Vm are connected, respectively, to ports 90c and 90b of a spring chamber 92 of the servo piston 90 through respective fluid lines 301 and 302, and the port 70c is further connected through a fluid line 303 to a port 70d of the manual valve Vm, and an inlet port 270a of a pressure-reducing valve 270 as well as to a port 100a of a throttle opening-responsive valve Vt of the engine. A port 70e is connected through a fluid line 304 to the second-speed clutch C2 as well as to a port 70g of the manual valve Vm, a port 210d of a timing valve 210, and a port 170a of a first accumulator 170. A port 70f of the manual valve Vm is connected to a port 130b of a second shift valve V2 through a fluid line 305, in which a restriction 350 and a one-way valve 380 are provided in parallel to each other. A port 70h is connected to the first-speed clutch C1 through a fluid line 313, in which a restriction 359 and a one-way valve 383 are provided in parallel to each other. The fluid line 313 is connected to inlet ports 400a and 400b of a flow rate control valve 400 via a fluid line 307 provided with a restriction 369. An outlet port 400d of the flow rate control valve 400 is connected to the first shift valve V1 via a fluid line 307a. The fluid line 307 is provided with a restriction 370 in the vicinity of the inlet port 400a of the flow rate control valve 400. A port 70i of the manual valve Vm is connected through a fluid line 308 to a port 90a of the servo piston 90. A port 70k is connected through a fluid line 309 to the fourth-speed clutch C4, a port 210e of the timing valve 210 as well as to a port 190a of a second accumulator 190. A port 70m is connected to a port 70n of the manual valve Vm, a port 130d of the second shift valve V2, and a port 160b of a first control valve 160 through a fluid line 310. The fluid line 310 connected to the port 130d of the second shift valve V2 is provided with a restriction 356 and a one-way valve 381 arranged in parallel to each other.

Ports 100b and 100c of the throttle opening-responsive valve Vt are connected to a fluid line 311, by way of which they are connected to ports 170b, 190b, and 180b of first to third accumulators 170, 190, and 180, a port 220f of a modulator valve 220, a port 230c of an on-off valve 230, a port 400c of the flow rate control valve 400, and also to respective ports 160a and 200a of the first and second control valves 160 and 200, the port 100b being connected to the fluid line 311 via a restriction 352. A port 100d of the throttle opening-responsive valve Vt is connected through a fluid line 312 provided with a restriction 353 to a port 130g of the second shift valve V2 and a drain line EX. A port 110a of a third control valve 110 is connected through a fluid line 315 to a port 120a of the first shift valve V1 and to the drain line EX. The fluid line 315 is connected to the drain line Ex via a restriction 354.

Ports 120c and 120d of the first shift valve V1 are connected through respective fluid lines 316 and 317 to respective ports 130a and 130c of the second shift valve V2, respectively. A port 120e is connected to a port 160c of a first control valve 160 and the drain line EX through a fluid line 318 provided with a restriction 355. A port 130e of the second shift valve V2 is connected to a fluid line 319 which leads to a port 200c of the second control valve 200 and to the drain line EX through a restriction 357. A port 130f is connected to the third speed clutch C3 as well as to a port 200b of the second control valve 200, and a port 180a of the third accumulator 180, through a fluid line 320, in which a restriction 358 and a one-way valve 382 are provided in parallel to each other. Incidentally, one of the two drain lines EX from the second shift valve V2 is provided with a restriction 356a.

A port 120f of the first shift valve V1 is connected via a fluid line 340 to an input port 140a of a first electromagnetic valve 140, and the fluid line 340 is connected to an output port 270b of the pressure-reducing valve 270 through a fluid line 341 provided with a restriction 361. A port 130h of the second shift valve V2 is connected to a port 150a of a second electromagnetic valve 150 through a fluid line 322a, which is connected to a fluid line 322 by way of a restriction 362. This fluid line 322 is connected to an output port 80b of the governor valve Vg. A filter 322a is provided across the fluid line 322.

The first and second electromagnetic valves 140, 150 each have a valve body 141, 151 held in a position to block a port 140a, 150a by the force of a spring 143, 153 when the respective solenoid 142, 152 is deenergized, and held in the rightward position, as viewed in FIG. 2, i.e. in the position to open the port 140a, 150a against the force of the spring 143, 153 when the solenoid is energized. In this way, the electromagnetic valve 140, 150 is closed and opened, respectively, in response to deenergization and energization of the respective solenoid 142, 152.

An outlet port 60c of the control valve Vr is connected through a fluid line 325 to a port 210a of a timing valve 210, and a port 230d of the on-off valve 230. The timing valve 210 has a port 210b connected to a fluid line 321 leading to a port 220d of the modulator valve 220 via a restriction 371. A port 210c is connected through a fluid line 327 to a port 220a of the modulator valve 220. A port 210f is connected through a fluid line 501a provided with a restriction 375 to a fluid line 501. The modulator valve 220 has a port 220b connected through a fluid line 326a provided with a restriction 372 to a fluid line 326, and a port 220b connected through a fluid line 353 provided with a restriction 373 to a port 230b of the on-off valve 230, and further a port 220e connected to a fluid line 322 provided with a restriction 366a. The on-off valve 230 has a port 230a connected to a fluid line 326, and another port 230e connected to a fluid line 334 through a fluid line 501 provided with a restriction 374.

An inlet port 240a of a third electromagnetic valve 240 is connected to a fluid line 326 via a restriction 367. The third electromagnetic valve 240 has a valve body 241 disposed to be urged by the force of a spring 243 to close the port 240a when its solenoid 242 is in a deenergized state, whereas the valve body 240 is moved rightward, as viewed in FIG. 2, against the force of the spring 243 to open the port 240a when the solenoid 242 is energized. In this way, the electromagnetic valve 240 is closed and opened, respectively, in response to deenergization and energization of the electromagnetic valve 242.

The torque converter T has a port Ta connected through a fluid line 334 provided with a restriction 368 to a fluid line 325, a port Tb connected to a fluid line 326, and a port Tc connected through a fluid line 335 to an inlet port 250a of a pressure-retaining valve 250. The pressure-retaining valve 250 has a pilot pressure introducing port 250b connected through a fluid line 336 to the fluid line 322 at a location upstream of the restriction 366a, and an output port 250c connected to the drain EX through a fluid line 337 provided with an oil cooler 260. All of the drains EX mentioned above are connected to the tank R.

The respective solenoids 142, 152, and 242 of the first through third electromagnetic valves 140, 150, and 240 are electrically connected to an electronic control unit 33 via signal lines 142a, 152a, and 242a, respectively. The electronic control unit 33 is responsive to input signals from a vehicle speed sensor 31, an engine rotational speed sensor 34, and a sensor 35 for sensing the position of the shaft lever or the manual valve Vm, etc. to control the electromagnetic valves 140, 150 in accordance with a predetermined gear shifting manner using a gear shifting map, to thereby selectively engage or disengage the first speed to fourth speed clutches C1-C4 for control of the gear shifting operation of the transmission.

The electromagnetic valve 240 is controlled by the electronic control unit 33 in response to a predetermined parameter representing the relative slip amount between the input and output elements of the torque converter T, e.g. the rotational speed ratio e between them. To be specific, in response to the result of comparison between the actual rotational speed ratio e and a predetermined reference value, the desired engaging force (transmission capacity) of the direct-coupling clutch Cd is determined, and the third electromagnetic valve 240 is controlled so as to attain the desired engaging force in the direct-coupling clutch Cd.

Further, electrically connected to the electronic control unit 33 is an operation mode selector switch (selector means) 33a for selecting as the vehicle operation mode either a power mode giving priority to the output power or an economy mode giving priority to curtailment of fuel consumption. The selector switch 33a is provided at a predetermined location on a dashboard in the passenger compartment of the vehicle so that the driver can operate it at will.

Now, the operation of the hydraulic pressure circuit described above will be explained.

Operating oil in the oil tank R is sucked and pressurized by the hydraulic oil pump P and then delivered to a fluid line 300 after having its pressure regulated by the control valve Vr to a predetermined level (the line pressure P1). A spring seat member 61 of the control valve Vr is disposed in urging contact with the stator arm 5b (FIG. 1), such that when the reaction force created by the stator 5 of the torque converter T exceeds a predetermined value the spring 62 is compressed by the stator arm 5b to thereby elevate the discharge pressure of the oil hydraulic pump P (hence the line pressure P1). A hydraulic oil control system of this kind is disclosed in detail by Japanese Patent Publication No. 45-30861. Part of the operating oil regulated in pressure by the control valve Vr is delivered to the torque converter T by way of the fluid line 334 provided with the restriction 368 and a port Ta to elevate the internal pressure of the torque converter T so as to eliminate cavitation therein and then returned to the oil tank R by way of the pressure-retaining valve 250 and the oil cooler 260.

The pressure-retaining valve 250 is arranged such that as the vehicle speed U increases the governor pressure PG increase to overcome the force of the spring 252 to displace the spool 251 rightward, as viewed in FIG. 2, whereupon the inlet port 250a and the outlet port 250c communicate with each other and thus the internal pressure of the torque converter T is discharged into the oil tank R. That is, the pressure-retaining valve 250 functions to reduce the internal pressure of the torque converter T in proportion to an increase in the vehicle speed U, the spool 251 being displaceable in response to the differential pressure between the governor pressure Pg and the internal pressure of the torque conveter T so that the maximum transmission capacity of the direct-coupling clutch Cd is elevated as the vehicle is running at a higher speed.

The manual valve Vm is manually operated through the shift lever (selector lever) by the driver to selectively assume one out of six shift positions (ranges), i.e., P (parking), R (rearward), N (neutral), D4 (four-forward-speed automatic gear shifting), D3 (three-forward-speed automatic gear shifting exclusive of TOP speed), and 2 (second speed-holding). One of six operating modes corresponding, respectively, to these shift positions is selected accordingly. When the spool 71 of the manual valve Vm is in the N position as shown in FIG. 2, the port 70b for communicating with the oil hydraulic pump P via the fluid line 300 is blocked by the spool 71, while all the other ports 70a, and 70c through 70n of the valve Vm are in communication with the drain EX whereby the four clutches C1–C4 for first to fourth speeds are all disengaged, to thereby prohibit the transmission of the engine torque to the driving wheels W and W' (FIG. 1).

When the spool 71 of the manual valve Vm is shifted leftward by one position from the position N, i.e., when the position D4 is assumed, the fluid lines 302 and 313 are both brought into communication with the fluid line 300 to be supplied with the pressurized oil, and at the same time the fluid lines 305 and 304 are brought into communication with each other. On this occasion, the fluid line 309 is brought into communication with the fluid line 310 but neither communicates with the drain EX nor with the fluid line 308, while the fluid line 301 maintains its communication with the drain EX. As a result, when the D4 position is assumed, the servo piston 90 for shifting the selector sleeve S (FIG. 1) has its spring chamber 92 supplied with the line pressure P1 from the pump P, whereby the spool 91 is hydrodynamically locked in the position illustrated in FIG. 2 and then the selector sleeve S is maintained in the position shown in FIG. 1 by the shift fork 39 secured to one end of the spool 91. Consequently, the fourth-speed driven gear 24 is brought into engagement with the selector clutch Cs, and the reverse driven gear 26 is disconnected from the output shaft 16 to be rendered freely rotatable.

Even when the spool 71 of the manual valve Vm is moved leftward by one position from the D4 position to assume the D3 position, there occurs no change in the relationship of connection between the fluid lines in communication with the manual valve Vm except that the fluid line 310 is caused to communicate with the drain EX via the ports 70m and 70n. When any one of the 2 position, the D3 position, and the D4 position is assumed, the pressurized oil is supplied to the throttle opening-responsive valve Vt via the fluid line 303. The throttle opening-responsive valve Vt is so constructed that as a cam 104 urging the spool 102 rotates counter-clockwise, as viewed in FIG. 2, through an angle proportionate to an increase in the opening of a throttle valve provided in the intake system of the engine E (the stepping amount of the throttle pedal, not shown, as a parameter representing the load on the engine E), the spool 101 is displaced leftward against the force of a spring 103 to open the port 100a and accordingly the discharge pressure from the port 100c is applied by way of the restriction 352 to the port 100b to thereby move the spool 101 rightward so as to reduce the opening of the port 100a to thereby supply the fluid line 311 with a pressure proportionate to the throttle valve opening (hereinafter referred to as throttle pressure Pt). On the other hand, counter-clockwise rotation of the cam 104 causes the spool 102 to slide leftward so as to gradually diminish the communication between the port 100d and the drain EX, thereby preventing a shock to be caused by gear shifting from the third speed ratio (3RD) to the second speed ratio (2ND) through kicking-down of the throttle pedal.

A cam 113 of the third control valve 110 interlocked with the cam 104 rotates counter-clockwise in response to an increase in the throttle valve opening to cause leftward displacement of a spool 111 against the force of the spring 112 so as to gradually diminish the communication between the port 110a and the drain EX to thereby prevent a shock to be caused by gear shifting from the fourth speed ratio (TOP) to the third speed ratio (3RD).

Also, the throttle pressure Pt is supplied via the fluid line 311 to the port 400c of the flow rate control valve 400 via the fluid line 311, to thereby control the valve 400. That is, when the flow rate control valve 400 is in the illustrated position, the operating oil pressure is introduced from the fluid line 307 via the restriction 370 into the first inlet port 400a alone, and then discharged into the port 120b of the first shift valve V1 from the outlet port 400d through the fluid line 307a. When the throttle pressure Pt is increased until it overcomes the force of the spring 402, the spool body 401 is moved leftward to allow the operating oil to pass through both the first and second inlet ports 400a, 400b, thereby increasing the amount of oil supplied from the outlet port 400d to the fluid line 307a. Accordingly, when the throttle valve opening is small, one clutch is prevented from engaging until another clutch in engagement is completely disengaged (i.e. two clutches are prevented from engaging at the same time which results in loss of energy and a drop in the vehicle speed). As a result, shocks are mitigated at such times as shifting-up when the accelerator or throttle pedal is relieved from its depressed position and shifting-down when the vehicle is about to stop running.

On the other hand, pressurized oil from the oil hydraulic pump P is also delivered to the inlet port 80a of the governor valve Vg which is driven by the enlarged gear DG appearing in FIG. 1 through a gear 81 meshing therewith to rotate about its own axis 82 at a speed proportionate to the vehicle speed U whereby an output pressure or governor pressure PG proportionate to the vehicle speed U is generated and supplied into the output fluid line 322 indicated by the broken line.

The first shift valve V1 connects the input fluid line 307a to the output line 316 when it is in a first position illustrated in FIG. 2, and at the same time connects another output line 317 to the drain EX via the fluid line 318. The first shift valve V1 has a spool 121 urged toward the first position by the force of a spring 122. The spool 121 of the first shift valve V1 is also displaceable leftward against the force of the spring 122, in response to a reduced pressure lower than the line pressure P1, which is supplied from the pressure-reducing valve 270 into a hydraulic pressure chamber 120A defined in part by a right end face of the spool 121, through a fluid line 341 with a restriction 361 therein and the fluid line 340, to assume a second position. When this second position is assumed, the output line 316 is connected to the drain EX through the fluid line 315, and at the same time the output line 317 is disconnected from the fluid line 318 and connected to the input line 307a.

Irrespective of whether the first shift valve V1 assumes the first position or the second position, the fluid line 313 is kept connected to the first-speed (LOW) clutch C1. Accordingly, when the manual valve Vm assumes the D3 position or the D4 position, the first-speed clutch C1 remains engaged. The spool 121 of the first shift valve V1 is controlled by the first electromagnetic valve 140 in a manner such that when the electromagnetic valve 140 is closed, the second position is assumed due to the reduced pressure introduced into the hydraulic pressure chamber 120A, while when the electromagnetic valve 140 is open, the first position is assumed due to the action of the spring 122.

The second shift valve V2, when assuming a first position as illustrated, blocks the input line 316 and connects the output port 130d to the drain EX, the input line 317 to the output line 305, and another output line 320 to the drain EX via the fluid line 312, respectively. The second shift valve V2 has a spool 131 urged toward the first position by a spring 132. The spool 131 of the second shift valve V2 is also displaceable leftward against the force of the spring 132 in response to the governor pressure PG which is introduced into a hydraulic pressure chamber 130A defined in part by an enlarged right end face of the spool 131 through the fluid line 322a via the port 130h. When a second position is thus assumed, an output port 130d is disconnected from the drain EX and connected to the input line 316, the output line 305 is connected to the drain EX through the fluid line 319, and the output line 320 is disconnected from the fluid line 312 and connected to the input line 317. The spool 131 of the second shift valve V2 is controlled by the second electromagnetic valve 150 in a manner such that when the electromagnetic valve 150 is closed, the second position is assumed due to the action of the governor pressure PG introduced into the hydraulic pressure chamber 130A, while when the electromagnetic valve 150 is open, the first position is assumed due to the action of the spring 132.

A click motion 133 is provided in the second shift valve V2 for causing a position-changing motion of the spool 131 to be carried out in a sharp or definite manner. This click motion 133 serves to positively hold the spool 131 of the second shift valve V2 in the first position or in the second position in response to a change in the governor pressure PG even when the second electromagnetic valve 150 is in the closed position.

During rotation of the engine E, operating fluid pressurized by the oil hydraulic pump P is delivered to the governor valve Vg and then regulated thereby into a signal pressure proportionate to the vehicle speed U to be supplied to the hydraulic pressure chamber 130A of the second shift valve V2. The same pressurized operating fluid pressure is also supplied to the pressure-reducing valve 270 and the resulting reduced pressure is supplied to the hydraulic pressure chamber 120A of the first shift valve V1. To maintain these shift valves V1, V2 in the respective first positions as illustrated when the manual valve Vm assumes the D4 position or the D3 position, the solenoids 142, 152 of the electromagnetic valves 140, 150 are both energized to open the valves. By doing so, the first-speed clutch C1 alone is engaged while the other clutches C2-C4 are not engaged, thus establishing the first speed ratio. Since the first speed ratio is generally intended to be established when the vehicle is running in a low speed region wherein the governor pressure PG is also low, the loss of the flow rate of the operating fluid to be returned to the tank R through the electromagnetic valve 150 and the restriction 362 is accordingly small, thus being economical. This is particularly advantageous when it is desired to maintain the operating fluid pressure at a high level throughout the hydraulic control system, i.e. at a level considerably higher than the normal pressure level (the line pressure P1), such as at standing start of the vehicle with the engine stalled where the vehicle speed is zero.

Next, if the first electromagnetic valve 140 has its solenoid 142 deenergized to be closed while the second electromagnetic valve 150 is kept energized with its solenoid 152 continually energized, a pressure reduced by the pressure-reducing valve 270 and introduced into the hydraulic pressure chamber 120A causes leftward displacement of the spool 121 of the shift valve V1 against the force of the spring 122. As a result, the fluid line 307a becomes connected to the fluid line 305 through the fluid line 317, which in turn is connected to the fluid line 304 via a port 70f of the manual valve Vm, a notch 71a in the spool 71 of the manual valve Vm and a port 70f of the valve when the manual valve Vm assumes the D4 position, and connected to the fluid line 304 via an annular groove 71b in the spool 71 and a port 700 when the manual valve Vm assumes the D3 position. Thus, on this occasion, irrespective of whether the D4 position or the D3 position is assumed, the second-speed clutch C2 is engaged. In this way, with the D4 position or the D3 position is assumed, the first-speed clutch C1 and the second-speed clutch C2 are both engaged. However, as shown in FIG. 1, the one-way clutch C0 interposed between the first-speed driven gear 18 and the counter shaft 16 then allows torque transmission only from the engine E to the driving wheels, thus establishing the second speed ratio.

Then, if the solenoid 152 of the electromagnetic valve 150 is also deenergized while the solenoid 142 of the electromagnetic valve 140 is kept deenergized, the hydraulic pressure chamber 130A of the second shift valve V2 is supplied with governor pressure PG indicative of the vehicle speed then assumed. The spool 131 is moved leftward to assume the second position only when the governor pressure PG overcomes the force of the spring 132 and the resisting force of the click motion 133, whereby the fluid line 305 becomes connected to the drain EX via the fluid line 319, thereby causing disengagement of the second-speed clutch C2, and at the same time the fluid line 320 becomes connected to the fluid line 317 leading to the operating fluid source, thereby causing engagement of the third-speed clutch C3. Also on this occasion, the first-speed clutch C1 remains engaged, but the one-way clutch C0 acts to cause establishment of the third speed ratio.

Next, if the solenoid 142 of the electromagnetic valve 140 is again energized with the solenoid 152 of the electromagnetic valve 150 kept deenergized, the spool 121 of the first shift valve V1 is moved rightward to again assume the illustrated position, whereby the fluid line 317 becomes connected to the drain EX through the fluid line 318, thereby causing disengagement of the third-speed clutch C3, and simultaneously the fluid line 316 becomes connected to the fluid source 307a, to thereby supply pressurized oil to the fluid line 310. The fluid line 310 is connected by way of the ports 70m and 70k of the manual valve Vm to the fluid line 309 when the manual valve Vm is in the D4 position, whereupon the fourth-speed clutch C4 is engaged. Although the first-speed clutch C1 also remains engaged at this time, the fourth speed ratio alone is established due to the action of the one-way clutch C0 as stated above. In the manner as described heretofore gear shifting between the four speed ratios is automatically carried out.

Table 1 shows, by way of example, the relationship between the speed ratios and the energizing condition of the solenoids 142 and 152, of the electromagnetic valves 140 and 150.

TABLE I

|  | Solenoid 142 | Solenoid 152 |
| --- | --- | --- |
| First Speed (LOW) | energized | energized |
| Second Speed | deenergized | energized |
| Third Speed | deenergized | deenergized |
| Fourth Speed (TOP) | energized | deenergized |

On the other hand, a surplus of the flow from the pump P oassing through the control valve Vr is delivered through the fluid line 334 provided with the restriction 368 into the torque converter T to thereby increase the internal pressure thereof and also is delivered to the timing valve 210 and the on-off valve 230 via the fluid line 325. This timing valve 210 has hydraulic pressure chambers 210A and 210B which are, respectively, subjected to oil pressures to be applied to the second-speed clutch C2 and the fourth-speed clutch C4, so that the spool 211 is moved leftward against the force of the spring 212 to assume a second shift position when the second or the fourth speed ratio is established, while when the first speed or the third speed ratio is established, the spool 211 is moved rightward by the force of the spring 212 to assume a first shift position as shown in FIG. 2.

The timing valve 210, whichever of the two shift positions may be assumed, connects the input fluid line 325 to the output fluid line 327, and at the same time connects the drain line 321 of the modulator valve 220 to the drain EX, but while it is shifting from one shift position to the other it disconnects the fluid line 327 from the input fluid line 325, and also disconnects the drain line 321 of the modulator valve 220 from the drain EX. The oil pressure discharged into the output fluid line 327 of the timing valve 210 is delivered to the modulator valve 220 which modulates the input oil pressure and outputs the modulated pressure to the output fluid line 353. The modulator valve 220 is responsive to the governor pressure PG and the throttle pressure Pt to modulate the operating oil pressure to thereby create the engaging force for the direct-coupling clutch Cd. The governor pressure PG and the throttle pressure Pt are introduced, respectively, into the chambers 220A, 220B through the respective fluid lines 322, 311. The modulator valves 220 has spool 221 displaced leftward by the pressures PG, Pt as well as by the force of a spring 222 to open the valve while the spool 221 has its left end face acted upon by a feedback pressure in the output fluid line 326 through the fluid line 326a and the restriction 372 so that the spool 221 is displaced rightward against the pressures PG, Pt and the force of the spring 222 to close the valve 220. As a result, a pressure is outputted to the output fluid line 353, which is proportionate to the vehicle speed U and the throttle valve opening.

If the output pressure from the modulator valve 220 increases to an excessively high level, the spool 221 of the valve 220 is moved rightward by the high feedback pressure against the PG, Pt and the force spring 222, thereby draining the output pressure to the drain EX. When no gear shifting is not being effected, the drain fluid line 321 of the modulator valve 220 is connected to the drain EX through the timing valve 210, while during gear shifting the spool 211 of the valve 210 is displaced to interrupt the communication between the fluid line 321 and the drain EX, thereby prohibiting drainage of the pressurized oil.

The reason for thus prohibiting drainage of the pressurized oil from the modulator valve 220 during gear shifting lies in that a drop in the engaging force of the direct-coupling clutch Cd is not desirable for positively executing the control of the engaging force of the direct-coupling clutch Cd (transmission capacity), because the enging force is controlled by means of the third electromagnetic valve 240 alone according to the invention. More specifically, during gear shifting the line pressure P1 temporarily drops due to the action of an accumulator, resulting in a corresponding temporary drop in the throttle pressure Pt. This causes rightward movement of the spool 221 of the modulator valve 220 as viewed in FIG. 2, and if on this occasion the drain fluid line 321 is connected to the drain EX, the engaging force of the direct-coupling clutch Cd per se drops. Therefore, such a drop in the engaging force during gear shifting can be prevented by arranging the modulator valve 220 so as to act in response to the action of the timing valve 210 during gear shifting such that the drain fluid line 321 of the modulator valve 220 is disconnected from the drain EX whereby no pressurized oil can be drained.

The pressure in the output fluid line 353 from the modulator valve 220 is guided to the cylinder 13 of the direct-coupling clutch Cd within the torque converter T by way of the restriction 373 provided in the fluid line 353, the port 230a of the on-off valve 230, and the fluid line 326. Thus, the engaging force of the direct-coupling clutch Cd (transmission capacity) is increased with an increase in either the vehicle speed U or the throttle valve opening if the third electromagnetic valve 240 is closed. The on-off valve 230 has its hydraulic pressure chamber 230A supplied with the throttle pressure Pt through the fluid line 311 so that the spool 231 is moved leftward as viewed in FIG. 2 by the supplied throttle pressure Pt against the force of the spring 232 to connect the input line 353 to the output line 326. On the other hand, when there is no throttle pressure Pt developed, that is, when the throttle valve is in the idle position, the spool 231 is moved rightward by the force of the spring 232 into a position illustrated in FIG. 2 to connect the output line 326 to the drain Ex and simultaneously connect the fluid line 325 to a fluid line 501. In this way, the on-off valve 230 acts to disengage the direct-coupling clutch Cd when the throttle valve opening assumes an idle opening. By thus connecting the fluid lines 325 and 501 together at the idle opening of the throttle valve, an increased amount of oil is supplied into the interior of the torque converter T through the input port Ta to increase the internal pressure thereof such that the piston 13 is displaced leftward as viewed in FIG. 2, thereby ensuring positive engagement of the direct-coupling clutch Cd during engine idling (i.e. when the throttle pedal is released from its depressed position).

The third electromagnetic valve 240 acts to selectively establish and interrupt the communication between the fluid line 326 and the drain EX so as to control the operating pressure for the direct-coupling clutch Cd or the pressure acting upon the piston 13, that is, the engaging force of the direct-coupling clutch Cd. When the third electromagnetic valve 240 has its solenoid 242 energized to become open, there occurs a drop in the oil pressure within the fluid line 326 due to the presence of the restriction 373 therein, thereby decreasing the engaging force of the direct-coupling clutch Cd or the transmission capacity of the automatic transmission.

Figure 4:
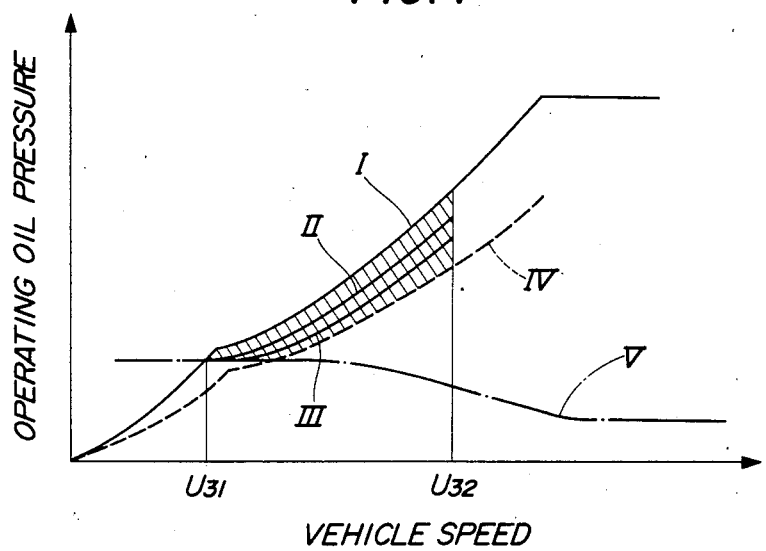
FIG. 4 is a graph showing the relationship between the operating oil pressure for the direct-coupling clutch and the vehicle speed.

The solenoid 242 of the third electromagnetic valve 240 is controlled by the electronic control unit 33, which detects the rotational speed ratio e between the input and output members of the torque converter T, so that the same rotational speed ratio e lies within a predetermined reference range, as described in detail later. When the third electromagnetic valve 240 has its solenoid 242 deenergized to be closed, the output per se of the modulator valve 220 forms the engaging force of the direct-coupling clutch Cd, which output is supplied through the on-off valve 230 and the fluid line 326 to the oil hydraulic cylinder 13 to act thereupon as the operating pressure. This operating pressure increases as the vehicle speed U increases as indicated by the solid line I in FIG. 4. Incidentally, the operating pressure characteristics of FIG. 4 are plotted without taking into account the influence of the throttle pressure Pt and the force of the spring 222. That is, the operating pressure curve indicated by the solid line I is based upon the assumption that the throttle valve assumes an idle opening and the spring 222 of the modulator valve 220 is omitted.

Figure 5:
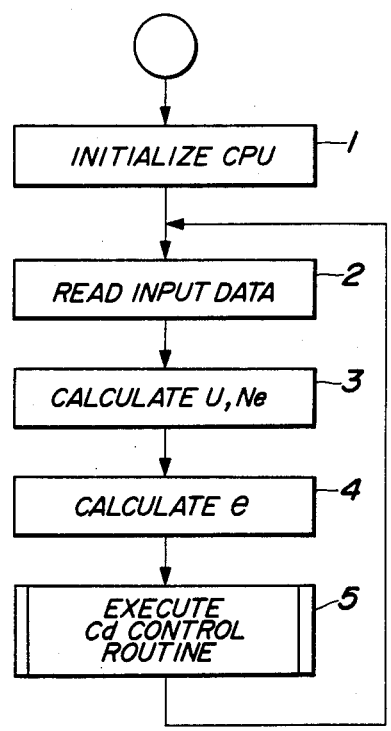
FIG. 5 is a main flow chart illustrating the procedure of controlling the operating oil pressure (or transmission capacity)
Figure 6:
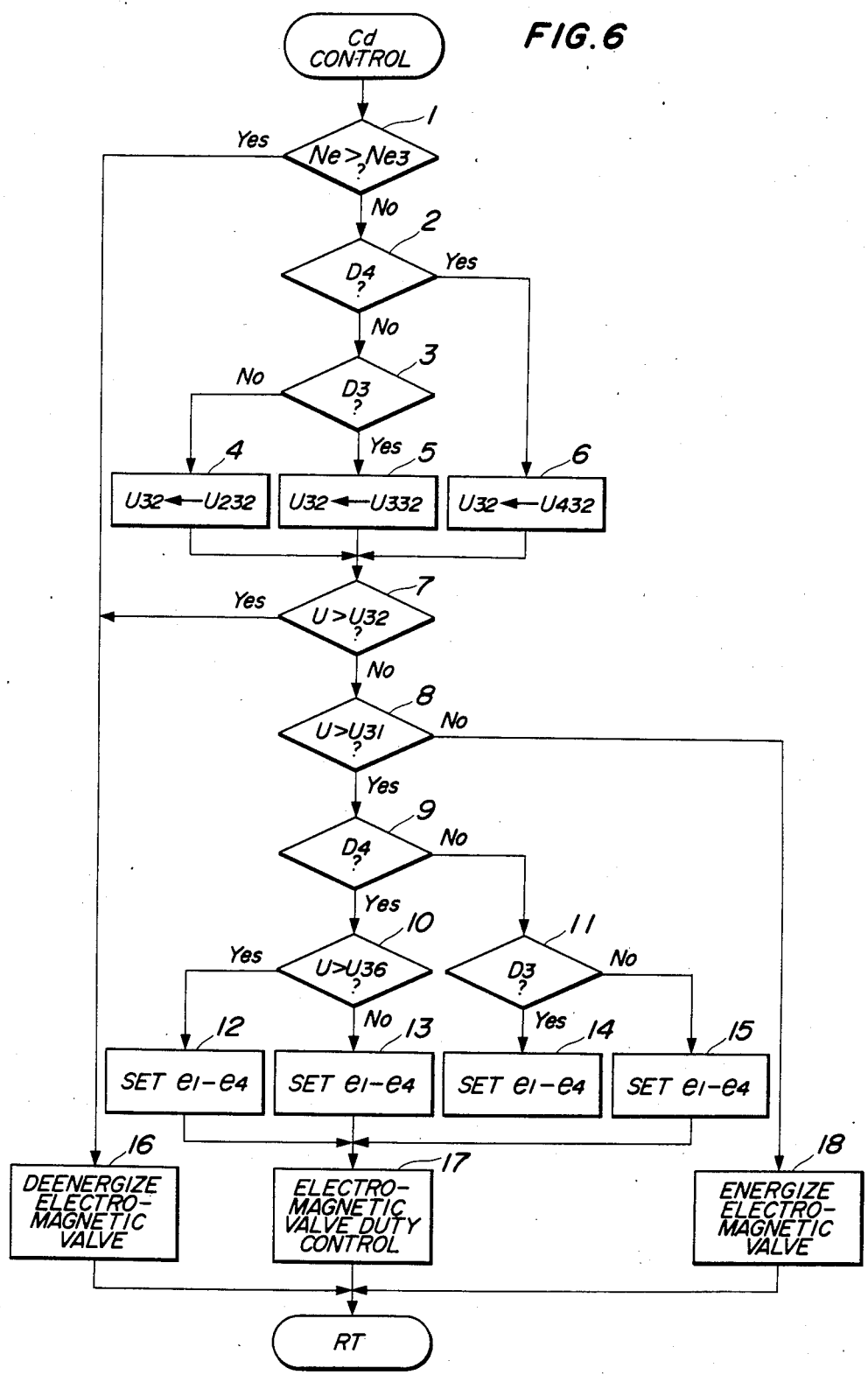
FIG. 6 is a sub-flowchart illustrating the control procedure effected in step 5 in FIG. 5.
Figure 7A:
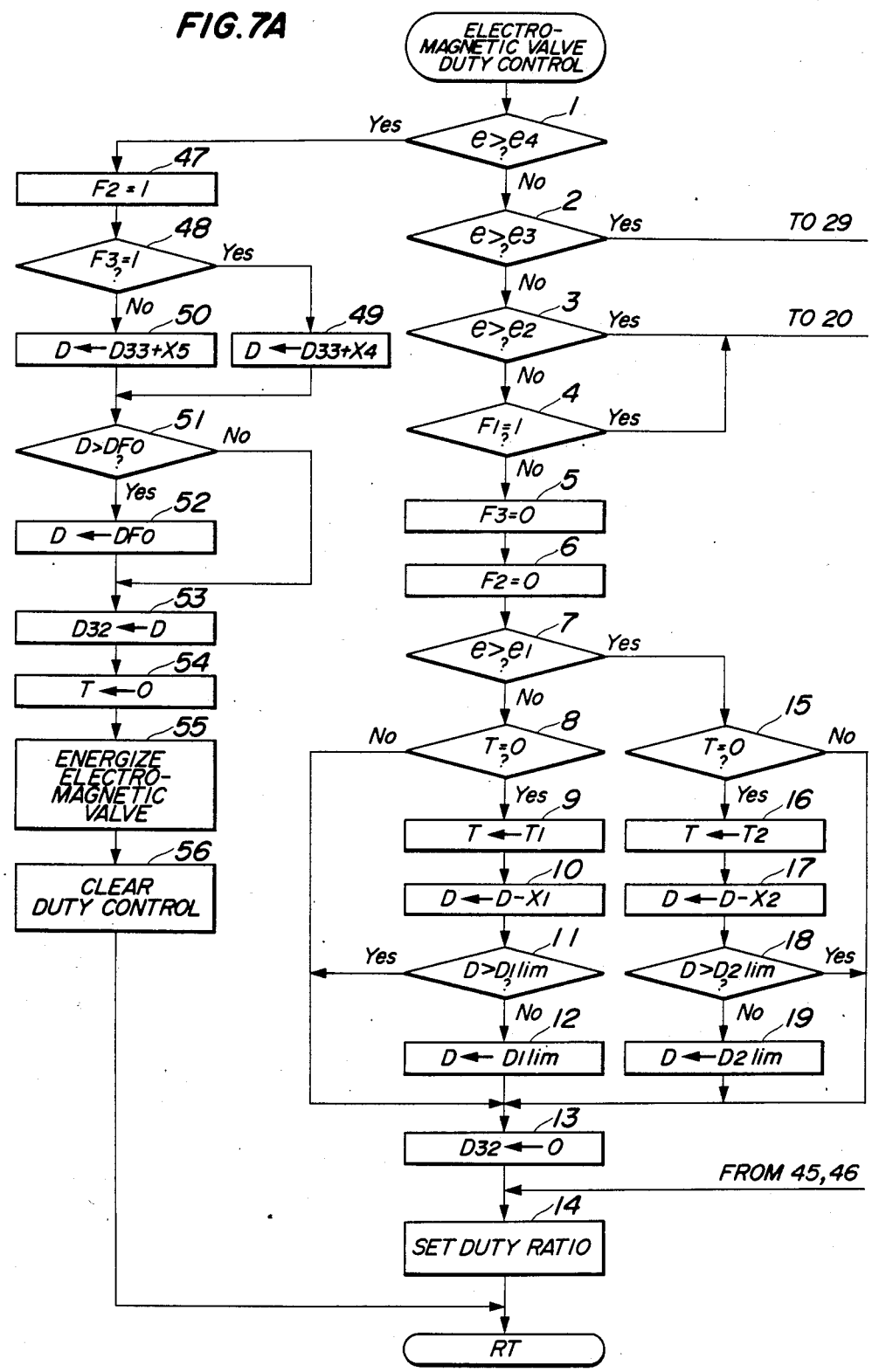

On the other hand, when the third electromagnetic valve 240 has its solenoid 242 energized to become open, the pressurized oil acting upon the oil hydraulic cylinder 13 is drained to the drain EX through the fluid line 326, the restriction 367 and the third electromagnetic valve 240 so that the engaging force of the direct-coupling clutch Cd is decreased, e.g. to zero. That is, the operating pressure acting upon the cylinder 13 has a characteristic as shown by the broken line IV in FIG. 4. Therefore, it is possible to control the operating pressure for the direct-coupling clutch Cd to any suitable values between the solid line I and the broken line IV in FIG. 4, by controlling the duty ratio or opening period of the third electromagnetic valve 240. In the present embodiment, 21 stages (0-20) are defined between the solid line I and the broken line IV in FIG. 4, the stages being each used as a correction amount in controlling the duty ratio, as described later. For example, the solid line III in FIG. 4 represents the operating pressure obtained when the on-duty ratio (hereinafter merely called "duty ratio") is 60%, and the solid line II represents same obtained when the duty ratio is 30%. In FIG. 4, the one-dot chain line V represents the internal pressure PT of the torque converter T, and the engaging force of the direct-coupling clutch Cd is governed by the differential pressure between the internal pressure PT and the operating fluid pressure as represented by the solid lines I through III, the broken line IV, etc. FIGS. 5 through 7 show flowcharts of a program for executing the duty ratio control according to the direct-coupling mechanism control method of the invention, which will be explained referring to the flowcharts.

In FIG. 5 First, when the ignition switch (not shown) is closed to start the engine, the CPU of the electronic control unit 33, shown in FIG. 2, is reset to be initialized (step 1), whereupon all of the variables used for controlling the transmission capacity of the direct-coupling clutch Cd are reset to respective initial values. Next, the input data from the vehicle speed sensor 31, the engine rotational speed sensor 34, the gear position sensor 35, etc. are read in (step 2), and then the time intervals at which the vechicle speed pulse signal and the engine rotational speed pulse signal are respectively inputted are measured to determine the vehicle speed U and the engine rotational speed Ne (step 3). Then, based on the determined values U and Ne, the rotational speed ratio e between the pump 2 of the torque converter T, appearing in FIGS. 1 and 2 and the turbine 4 of same (step 4). The value e is calculated in the following manner.

The rotational speed ratio e of the torque converter T is expressed by an equation given below, where N2 is the rotational speed of the turbine 4:

$$e = Ne/N2 \quad (1)$$

Since the torque converter output shaft (i.e. the input shaft 3 of the auxiliary transmission M) and the speedometer cable 30 are connected with each other by means of a gear train, no slip can take place between the two members. Therefore, the rotational speed N2 of the torque converter output shaft 3 can be expressed as follows:

$$e = A \times N3 \quad (2)$$

where A represents the reduction ratio between the torque converter output shaft 3 and the speedometer cable 30, and N3 the rotational speed of the speedometer cable 30.

By substituting the equation (2) into the equation (1), the rotational speed ratio e can be expressed as follows:

$$e = Ne/AN3 \quad (3)$$

If the auxiliary transmission M is a 4-speed change gear type, the value of the reduction ratio A can selectively assume values $A_1$-$A_4$ corresponding, respectively, to the reduction ratios for first speed to fourth speed.

A rotational speed sensor may be provided on the input shaft 3 of the auxiliary transmission M in order to sense the output rotational speed of the torque converter T.

After the value e has been calculated at step 4, the program proceeds to step 5 wherein a routine for controlling the direct-coupling clutch Cd (Cd CONTROL) shown in FIG. 6 is executed.

Referring to FIG. 6, it is determined whether or not the engine rotational speed Ne is higher than a predetermined value Ne3 (e.g. 3,500 rpm) at step 1. If the answer is Yes, the program proceeds to step 16 where the third electromagnetic valve 240 is deenergized (closed) to increase the operating oil pressure for the direct-coupling clutch Cd, i.e., increase the engaging force of the direct-coupling clutch Cd. This is because at an engine speed higher than 3,500 rpm there is no fear of occurrence of vibrations of the vehicle body, and therefore it is then possible to prevent the clutch Cd from slipping by increasing the engaging force of same, which results in a prolonged life of the clutch and reduced fuel consumption. On this occasion, the operating pressure applied to the direct-coupling clutch Cd is caused to vary along the solid line I in FIG. 4.

If the answer to the question of step 1 is No, it is determined at step 2 whether or not the shift lever of the auxiliary transmission M is in the D4 drive range position. If the answer is Yes, the program proceeds to step 6, while if the answer is No, the program proceeds to step 3, where it is determined whether or not the shift lever is in the D3 drive range position. If the answer to the question of step 3 is Yes, that is, if the shift lever is in the D3 drive range position, the program proceeds to step 5, while if the answer is No, the program proceeds to step 4. If, as a result of the determinations at steps 2 and 3, the shift lever is in the D4 drive range position, the program proceeds to step 6 wherein the vehicle speed upper limit value U32 is set to a predetermined value U432 (e.g. 85 km/h), while if the shift lever is in the D3 drive range position, the program proceeds to step 5 wherein the upper limit value U32 is set to a predetermined value U332 (e.g. 40 km/h). If the shift lever is in either the second speed-holding position or the first speed holding position, the program proceeds to step 4 wherein the upper limit value U32 is set to a predetermined value U232 (e.g. 30 km/h). After the vehicle speed upper limit value U32 has been set to any one of the above values U232, U332, and U432, the program proceeds to step 7 to determine whether or not the vehicle speed U is higher than a value of the upper limit value U32 set in one of the steps 4 through 6, and if the answer is Yes, the program proceeds to step 16 where the third electromagnetic valve 240 is closed to increase the engaging force of the direct-coupling clutch Cd, since then there is no fear of occurrence of vibrations of the vehicle body, etc.

If the answer to the question of step 7 is No, that is, if the vehicle speed U is lower than the vehicle speed upper limit value U32, the program proceeds to step 8, where it is determined whether or not the vehicle speed U is lower than a vehicle speed lower limit value U31 (e.g. 6 km/h). If the answer is No, that is, if the vehicle speed U is lower than the lower limit value U31, or in a low vehicle speed region wherein torque amplification by the torque converter T is required, the program proceeds to step 18 to energize (open) the third electromagnetic valve 240, to thereby reduce the engaging force of the direct-coupling clutch Cd so that the torque converter T is allowed to exhibit its function. On this occasion, the pressure of operating oil supplied to the direct-coupling clutch Cd is caused to vary along the broken line IV in FIG. 4.

If the answer to step 8 is Yes, that is, if the vehicle speed U is higher than the lower limit value U31, the program proceeds to step 9 to determine whether or not the shift lever of the auxiliary transmission M is in the D4 drive range position. If the answer is Yes, the program proceeds to step 10 to determine whether or not the economy mode, i.e. the fuel consumption priority mode is selected, and if the answer is Yes again, that is, if by the mode selector switch 33a the economy mode (fuel consumption priority mode) is selected, the program executes the step 12 to set region-defining values e1 through e4, e.g. e1 to 92%, e2 to 97%, e3 to 99.5%, and e4 to 102%, respectively. The region-defining value e1 is an upper limit value of a region wherein the engaging force of the direct-coupling clutch Cd is weak (hereinafter called "the weak engaging force region") and at the same time, a lower limit value of a region in the vicinity of the reference region (hereinafter called "reference value region vicinity region"). The region-defining value e2 is an upper limit value of the reference value vicinity region, and also a lower limit value of the reference value region (target region). The region-defining value e3 is an upper limit value of the reference value region, and also a lower limit value of a fine-control region. The region-defining value e4 is an upper limit value of the fine-control region and also a lower limit value of a region where the solenoid is energized to open the third electromagnetic valve 240 (hereinafter called "solenoid-on region").

If the answer to the question of step 10 is No, that is, if the D4 position is assumed by the shift lever and at the same time the power mode (output power priority mode) is selected, the program executes the step 13 to set the region-defining values e1 through e4, for instance, to 88%, 94%, 97.5%, and 99%, respectively.

If the answer to the question of step 9 is No, that is, if the fourth speed reduction ratio is not assumed, then the program proceeds to step 11 to determined whether or not the third speed reduction ratio is assumed. If the answer at step 11 is Yes, that is, if the third speed reduction ratio is assumed, the program executes the step 14 to set the region-defining values e1 through e4, for instance, to 83%, 91%, 95.5%, and 98% respectively.

If the answer to the question of step 11 is No, that is, neither the fourth speed nor the third speed reduction ratio is assumed, the program executes the step 15 to set the region-defining values e1 through e4, for instance, to 83%, 90%, 94.5%, and 97%, respectively.

The reason for setting the region-defining values e1 through e4 to be employed when the shift lever is in the high speed range position (D4) at higher values than those of the region-defining values e1 through e4 to be employed when the shift lever is in the low speed range position (D3 and 2nd) is as follows. The shift lever is shifted at the driver's will to appropriate positions that enables improving fuel consumption or output power. When he driver desires that output power should be given priority over fuel consumption, the shift lever is shifted to the high speed range position D4. At speed reduction ratios corresponding to the high speed range position of the shift lever, it is possible to raise the predetermined reference range value that determines the relative slip amount between the pump 2 and the turbine 4, by increasing the region-defining values e1 through e4 so as to make the rotational speed ratio e as close to 1 as possible without incurring vehicle body vibrations, whereby fuel consumption is reduced. On the other hand, it is intended to improve output power rather than fuel consumption that when the shift lever is shifted to the D3 or 2nd speed position, the region-defining values e1 through e4 are set to smaller values than those to be employed when the shift lever is in the D4 position.

After the values e1 through e4 have thus been set at steps 12 through 15, the program proceeds to step 17 to execute a routine for controlling the duty ratio of the electromagnetic valve 240 (Electromagnetic Valve Duty Control) shown in FIG. 7.

Referring to FIG. 7, steps 1, 2, 3, and 7 are for determining which one of the aforementioned rotational speed ratio regions the present rotational speed ratio e lies in. In the case where the rotational speed ratio e is increasing, if the rotational speed ratio is in the weak engaging force region, then the question to step 7, i.e. whether or not the rotational speed ratio e is greater than the region-defining value e1, gives an answer of No, whereupon the program prooceeds to step 8 to determine whether or not a set timer period T1 has elapsed (T=0).

FIG. 8 shows a manner of duty ratio control in the case where the rotational speed ratio e increases from the weak engaging force region through the reference value vicinity region and enters the reference value region. It is seen from FIG. 8 that as the rotational speed ratio e approaches the reference value region, the rate of increase in the transmission capacity of the direct-coupling clutch Cd is decreased.

When the rotational speed ratio e is in the weak engaging force region, the engaging force of the direct-coupling clutch Cd is gradually increased through duty ratio control of the opening period of the third electromagnetic valve 240 in such a manner that the duty ratio is reduced by a small duty correction value X1 (e.g. 1, equivalent to one stage of 21 stages into which the duty ratio is divided) each time the set timer period T1 (e.g. 0.2 sec) elapses. Incidentally, the duty ratio for the third electromagnetic valve 240 is defined as the ratio of the time period over which the solenoid 242 is energized to a predetermined time period (e.g. 100 ms), and if the duty ratio is divided into 21 stages +D0–D20, the energization period per stage becomes 5 ms for instance. In FIG. 7, if the answer to the question at step 8 is Yes, that is, if the set timer period T1 has elapsed (at time points t1, t2, and t3 in FIG. 8), the timer (not shown) is reset to the timer period T1 at step 9, and then a variable value D is reduced by the correction value X1 (i.e. set to D−X1) and stored at step 10. Thus, the valve opening of the third electromagnetic valve 240 is controlled with the duty ratio corresponding to the present value D for the period T1 repeatedly (steps 8–13). Step 11 is for a limit check, where it is determined whether or not the variable D is greater than a minimum value D1 lim (e.g. 0). If the answer is No, i.e. if the variable D is smaller than D1 lim, the variable D is set to the minimum value D1 lim at step 13, since the variable D smaller than 0 causes an inconvenience in the program control. If the answer to the question of step 11 is Yes, i.e. if the variable D is greater than D1 lim, the program skips step 12 and proceeds to step 13.

At step 13, the variable D which has been set to D-X, at step 10 is stored as a value D32 to be used later for control when the rotational speed ratio e enters the reference value region. Next, at step 14 the counter for controlling the time period over which the solenoid 242 of the third electromagnetic value 240 is energized is set to a value corresponding to the variable value D, and then the program returns to step 2 in FIG. 5 to repeat the prosecution of the routine. Incidentally, until the duty ratio for the third electromagnetic valve 240 is set to a new value, the electromagnetic control unit 33 causes the third electromagnetic valve 240 to repeatedly open with the present duty ratio, i.e. at a constant period.

Then, when the rotational speed ratio e enters the weak engaging force region, the engaging forces of the direct-coupling clutch Cd is increased by the correction value X1 each time the period T1 elapses.

Next, when the rotational speed ratio e enters the reference value vicinity region (at time point t4 in FIG. 8), the answer to the question of step 7 becomes Yes, whereupon the program proceeds to step 15 to determine whether or not the set timer period T has elapsed. The set timer period T is the value T1 set immediately before the rotational speed ratio e enters the reference value vicinity region from the weak engaging force region, i.e. at time point t3 in FIG. 8. If the answer to the question of step 15 is No, that is, if the timer period T1 has not elapsed, the program skips steps 16 through 19 and executes steps 13 and 14 to control the third electromagnetic valve 240 to open with the duty ratio which was set when the rotational speed ratio e was in the weak engaging force region. If the answer to the question of step 15 is Yes, that is, if the timer period T1 has elapsed (at time point t5 in FIG. 8), then at step 16 the variable T is set to a predetermined timer period T2 (e.g. 1 sec) which is greater than T1, and at step 17 the variable D is set to a value (D−X2) which is smaller than the previously set value D by X2 (e.g. 1 which corresponds to one stage like X1), and the valve opening of the third electromagnetic valve 240 is controlled with the duty ratio corresponding to the newly set value D for the timer period T2 repeatedly. Then, when the timer period T2 has elapsed and also the rotational speed ratio e is still in the reference value vicinity region (at time point t6 in FIG. 8), the program repeats steps 15 through 19 and 13. Incidentally, step 18 is for a limit check, where it is determined whether or not the variable D is greater than a minimum value D2 lim (e.g. 0), and if the answer is No, i.e. if the variable D is smaller than the minimum value D2 lim, the variable D is set to D2 lim at step 19, and the program proceeds to step 13. If the answer to the question of step 18 is Yes, i.e. if the variable D is greater than D2 lim, the program skips step 19 to proceed to step 13.

Next, when the rotational speed ratio e enters the reference value region at t7 in FIG. 8, the rotational speed ratio e becomes greater than the region-defining value e2 and hence the answer to the question of step 3 becomes Yes, whereupon the program proceeds to step 20 to set a flag signal value F1 (referred to later) to 0. Then, at step 21 it is determined whether or not a flag signal value F3 (also referred to later) is set to 1. If the rotational speed ratio e has entered the reference value region from the reference value vicinity region, the flag signal values F2 and F3 are both set to 0 at steps 5 and 6, respectively, and, therefore, the answers to the questions of steps 21 and 24 become No, wherein the step 24 determinines whether the flag signal value F2 is 1. The program proceeds to step 26 to determine whether or not the set timer period T has elapsed. The set timer period is the value T2 set when the rotational speed ratio e is in the reference value vicinity region, e.g. at time point t6 in FIG. 8. If the answer to the question of step 26 is No, that is, if the timer period T2 has not elapsed, the program skips steps 27 and 28 and executes steps 41 through 46 and then step 14 to continually control the third electromagnetic valve 240 to open with the duty ratio which was set when the rotational speed ratio e was in the reference value vicinity region. If the answer to the question of step 25 is Yes, that is, if the timer period T2 has elapsed (at time point t8 in FIG. 8), then at step 27 the variable T is set to a predetermined value T3 (e.g. 2 sec) which is selected when the rotational speed ratio e is in the reference value region, and then at step 28 the variable D is set to the value D32 which has been stored at step 13 in the previous loop, that is, immediately before the rotational speed ratio e enters the reference value region from the reference value vicinity region (at time point t6 in FIG. 8). Thus, when the rotational speed ratio e enters the reference value region, the third electromagnetic valve 240 is continually controlled with the same duty ratio corresponding to the value D as was set immediately before the rotational speed ratio e enters the reference value region (at t6 in FIG. 8) until the timer period T3 elapses (i.e. until time point t9 in FIG. 8). Even after t9 is reached, so long as the rotational speed ratio e remains in the reference value region the valve 240 is controlled so as to maintain the same transmission capacity of the direct-coupling clutch Cd, i.e. the duty ratio employed.

Figure 9:
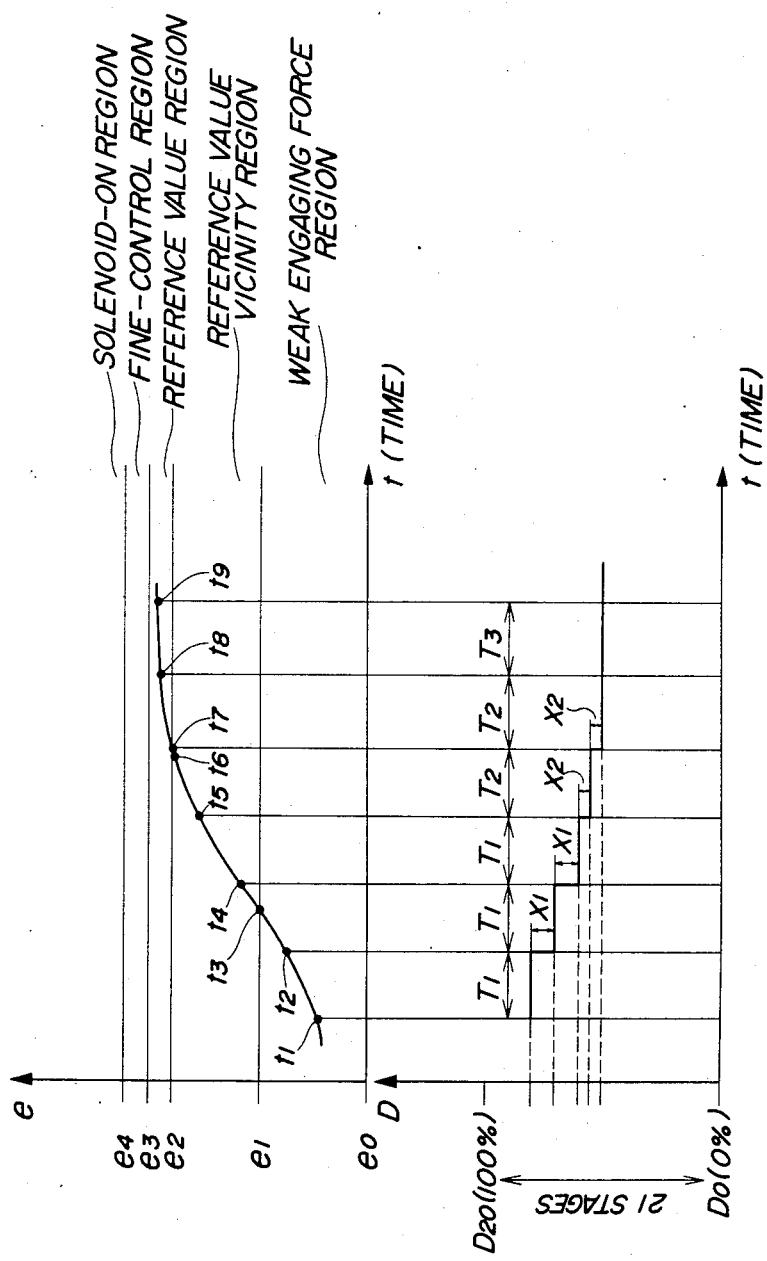
FIG. 9 is a graph showing a relationship between the rotational speed ratio and the duty ratio in the case where the rotational speed ratio e increases from the weak engaging force region through the reference value vicinity region and enters the reference value region, during which the duty ratio correction value is changed and the timer period is unchanged.

FIG. 9 shows a manner of duty ratio control, which is different from the manner shown in FIG. 8, in the case where, like FIG. 8, the rotational speed ratio e increases from the weak engaging force region through the reference value vicinity region and enters the reference value region. While according to the manner of FIG. 8, the rate of change of the rotational speed ratio e is decreased as the rotational speed ratio e approaches the reference value region since T1, T2, and T3 are set to different values whereas X1 and X2 are set to the same value, according to the manner of FIG. 9, the rate of change of the rotational speed ratio e is decreased as the rotational speed ratio e approaches the reference value region by setting T1, T2, and T3 to the same value and X1 and X2 to different values.

Figure 10:
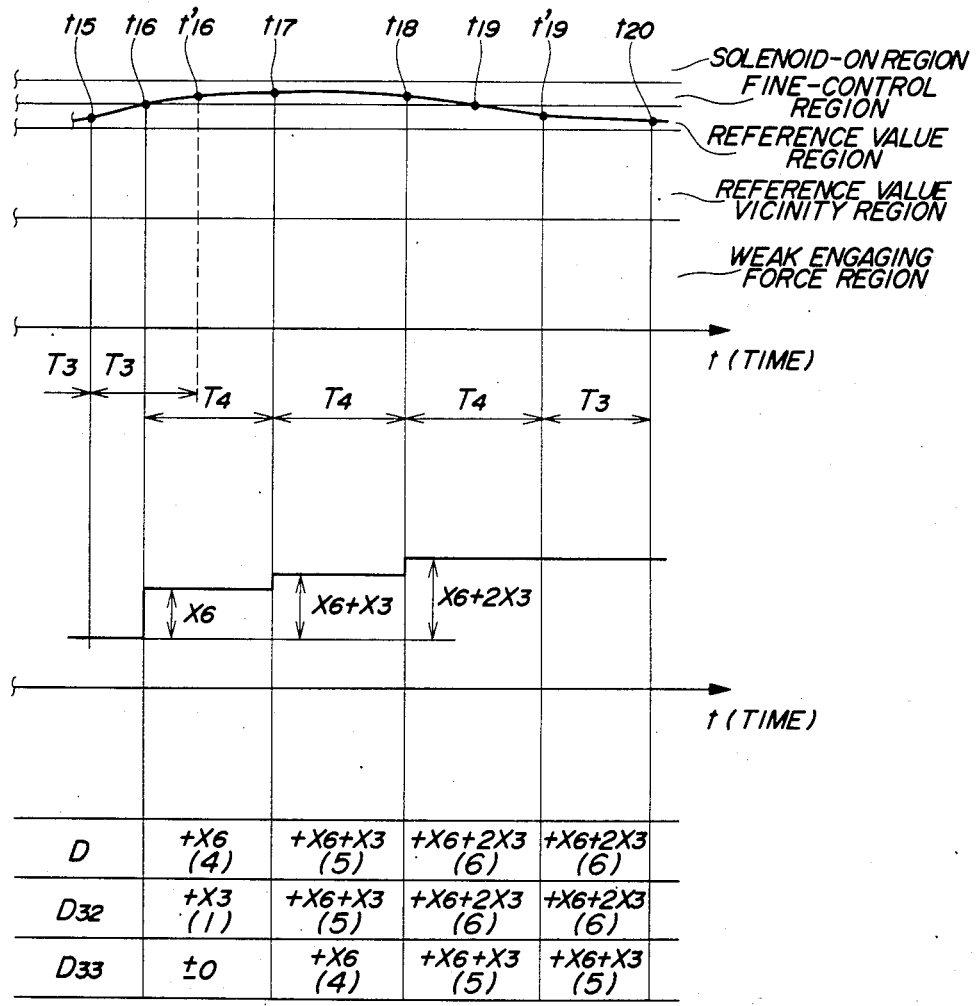
FIG. 10 is a schematic diagram illustrating how
Figure 10:
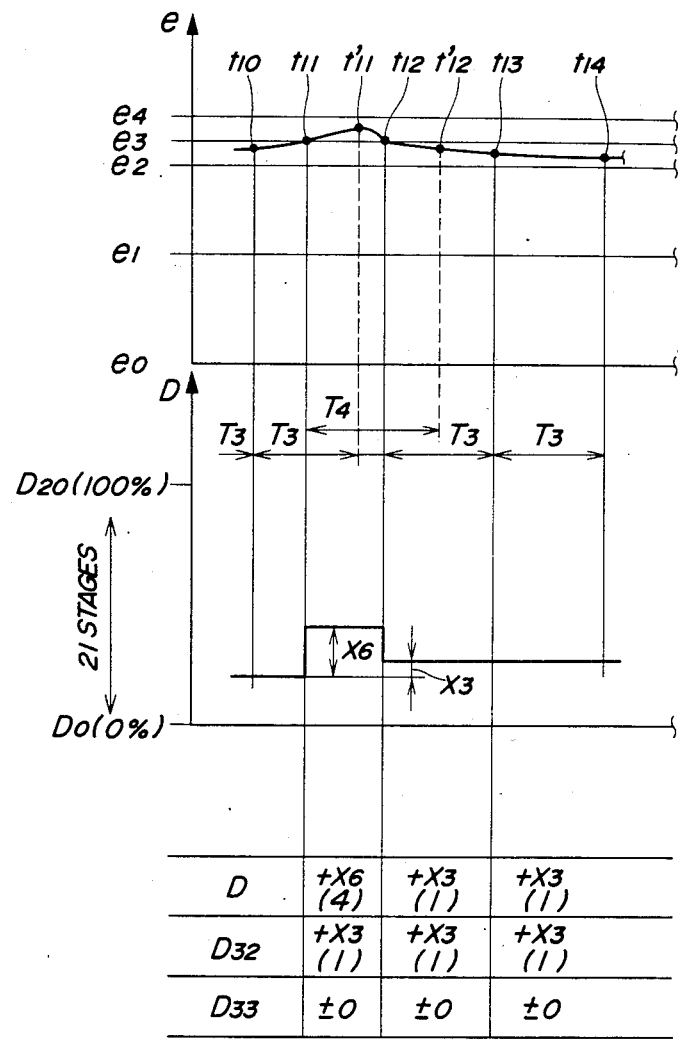

FIG. 10 shows a manner of duty ratio control in the case where the rotational speed ratio e increases from the reference value region and enters the fine-control region, supradjacent the reference value region, and then returns to the reference value region, without entering the higher solenoid-on region. If at the beginning the rotational speed ratio e has entered the reference value region from the lower region, the flags F1, F2, and F3 are all set to 0. Therefore, as seen in (a) of FIG. 10, if the rotational speed ratio e increases from the reference value region (at time point t10) to enter the next higher region, i.e. the fine-control region, at time point t11, the rotational speed ratio e becomes greater than the region-defining value e3, that is, the answer to the question of step 2 in FIG. 7 becomes Yes, whereupon the program proceeds to step 29 to set the flag signal value F1 to 1. Then, since the flag signal value F2 has been set to 0, the answer to the question of step 30, which determines whether or not the flag F2 is 0, is Yes, and therefore the program proceeds to step 31 to set the flag F2 to 1. Next, at step 32 the present value of the variable D32 is stored as a variable D33. The value of D32 is equal to the value D which was employed when the rotational speed ratio e was in the reference value region, that is, the value D which was set at step 28. Incidentally, variation of the variables D, D32, and D33 with the lapse of time as well as that of the rotational speed ratio e are indicated FIG. 10. The values given for the variables D, D32, and D33 are indicated in FIG. 10 in terms of difference values with respect to the respective values which are set when the rotational speed ratio e is in the reference value region, that is, with respect to D33 as set at step 32.

Then, at step 33 the timer is set to a predetermined timer period T4 (e.g. 0.4 sec), and at step 34 the variable D to be employed at t11 is set to a value which is the sum of the previous value of D33 and X6 (e.g. 4, equivalent to four stages of 21 stages into which the duty ratio is divided). Then, the program executes steps 41 through 46 and 14, and then returns to step 2 in FIG. 5 to repeat the routine.

It should be noted that although the timer period T3, which is set immediately before the rotational speed ratio e enters the fine-control region from the reference value region, e.g. at time point t10 in (a) of FIG. 10, does not elapse until time point t11, the timer is set to the timer period T4 at time point t11 at which the rotational speed ratio e reaches the region-defining value e3, that is, the lower limit value of the fine-control region (step 33), and then until the timer period T4 elapses, the control is continued based on the value D set at step 34. In the next loop, since flag F2 is set to 1 at step 31 in the preceding loop, the answer to the question of step 30 is No, so that the program proceeds to step 35. Since the timer period T4 has not elapsed yet then, the answer to the question of step 35 whether or not the timer period T4 has elapsed is No. Then, the program proceeds to step 36 to set the variable D32 to a value which is the sum of the value of D33, set at step 32, and X3 (e.g. 1). Supposing that the variable D set when the rotational speed ratio e was in the reference value region is called D0, the new value D32 is equal to the sum of D0 and X3 since at step 32 in the preceding loop the variable D33 was set to the value of D32.

If the rotational speed ratio e returns to the reference value region before the timer period T4 elapses, as at t12 in (a) of FIG. 10, the answer to the question at step 3 becomes Yes, whereupon the program proceeds to step 20 to set flag F1 to 0. Then since flag F3 has been set at 0 the program goes to step 24 after step 21. As flag F2 has been set to 1 at step 31, the answer to the question at step 24 is Yes, and then flag F2 is set to 0 at step 25, from which the program proceeds to step 27 while skipping step 26 to set the timer to the predetermined value T3 again. Skipping step 26 means that the timer is reset simultaneously when the rotational speed ratio e returns to the reference value region, and a new time period is set.

Next, at step 28 the variable D is set to the value D32 set at step 36 in the preceding loop, whereupon with the duty ratio corresponding to this D32 the valve opening of the third electromagnetic valve 240 is controlled.

The timer period T3 elapses at t13, but so long as the rotational speed ratio e remains in the reference value region the timer is again reset to the value T3 (step 27) and the value D also remains unchanged, so that after time point t14 the electromagnetic valve 240 is also controlled with the same duty ratio corresponding to the value of D32 (step 28).

(a) of FIG. 10 shows a case where the rotational speed ratio e remains in the fine-control region for a short period (shorter than the timer period T4) after entering there from the reference value region. The fact that the rotational speed ratio e returns to the reference value region at t12 before the timer period T4 has elapsed as a result of correcting the value D by such a large value as X6 at t11 when the rotational speed ratio e entered the fine-control region means that the correction value X6 is too large. Therefore, simultaneously when the rotational speed ratio e returns to the reference value region, which is at t12, a correction is made to the duty ratio such that the variable D is newly set to the sum of a smaller value X3 and the value D33 set immediately before the rotational speed ratio e entered the fine-control region (i.e. at t10), whereby the rotational speed ratio e is held in the reference value region.

(b) of FIG. 10 shows a case where the rotational speed ratio e increases from the reference value region at the point t15, and enters the fine-control region at t16, whereupon a correction is made by a large value X6 but the ratio e remains in the fine-control region for a long period (longer than the timer period T4) without immediately returning to the reference value region. In this case, the duty ratio is controlled such that the variable D is newly set to the sum of the variable D33 set at t15 immediately before the speed ratio e enters the fine-control region, and a correction value corresponding to the length of time period over which the speed ratio e has remained in the fine-control region, e.g. X6 set at $+16$, (X6+X3) set at $+17$, and (X6+2×X3) set at t18, whereby the rotational speed ratio e is held in the reference value region.

Therefore, in the case of (b) of FIG. 10 steps 29 through 34 are executed at time point t16, as executed at time point t11 in the case of (a) of FIG. 10 and during the time period between t16 and t17 steps 29, 30, 35, and 36 are executed. When t17 is reached, that is, when the timer period T4 elapses, the answer to the question of step 35 becomes Yes, whereupon the program proceeds to step 37 to set flag F3 to 1, and then proceeds to step 38 to set the variable D33 to the value of D which was used in the preceding loop. Then, at step 39 the timer is again set to the value T4, and at step 40 the variable D is set to a value which is the sum of the preceding value of D and X3 (e.g. 1). Then, until time point t18 is reached, that is, until the timer period T4 elapses again, steps 29, 30, 35, and 36 are repeatedly executed, wherein the variable D32 is set to the sum of D33 and X3 at step 36. If as of time point t18 the rotational speed ratio e is still in the fine-control region, then steps 37 and 38 are executed similarly as in the aforementioned case, wherein the variable D33 is set to a value which is the sum of the preceding value D33 and X3, and further at step 40 the value D is increased by X3, whereby the duty ratio is further increased, based on which the duty ratio control is repeated. Then, when the rotational speed ratio e returns to the reference value region at t19, steps 20 and 21 are executed. Since flag F3 has been set to 1 at step 37, the answer to the question at step 21 is Yes, and the program proceeds to steps 22 and 23 to set flags F3 to 0 and F2 to 0, respectively, from which the program proceeds to step 26 while skipping step 24 to determine whether or not the timer period T4 has elapsed. The reason for skipping of step 24, i.e. omitting determination of the value of of flag F2, is that the rate of change of the rotational speed ratio e is the small. While the rotational speed ratio e is thus changing gently, the duty value D which was set in the preceding loop is used again. In other words, until the timer period T4 elapses, that is, until t'19 is reached, the duty ratio control is conducted with the same duty value that was set in the previous loop. When t'19 is reached, the answer to the question of step 26 becomes Yes, and then at step 27 the timer is set to the value T3, and at step 28 the variable D is set to the value of D32 which was set at step 36 when the rotational speed ratio e was about to leave the fine-control region.

In this way, when the rotational speed ratio e returns to the reference value region, the present value of D is used for the duty ratio control, and even after t20 when the timer period elapses, the same value of D is used for the duty ratio control, so long as the rotational speed ratio e stays in the reference value region.

Figure 11:
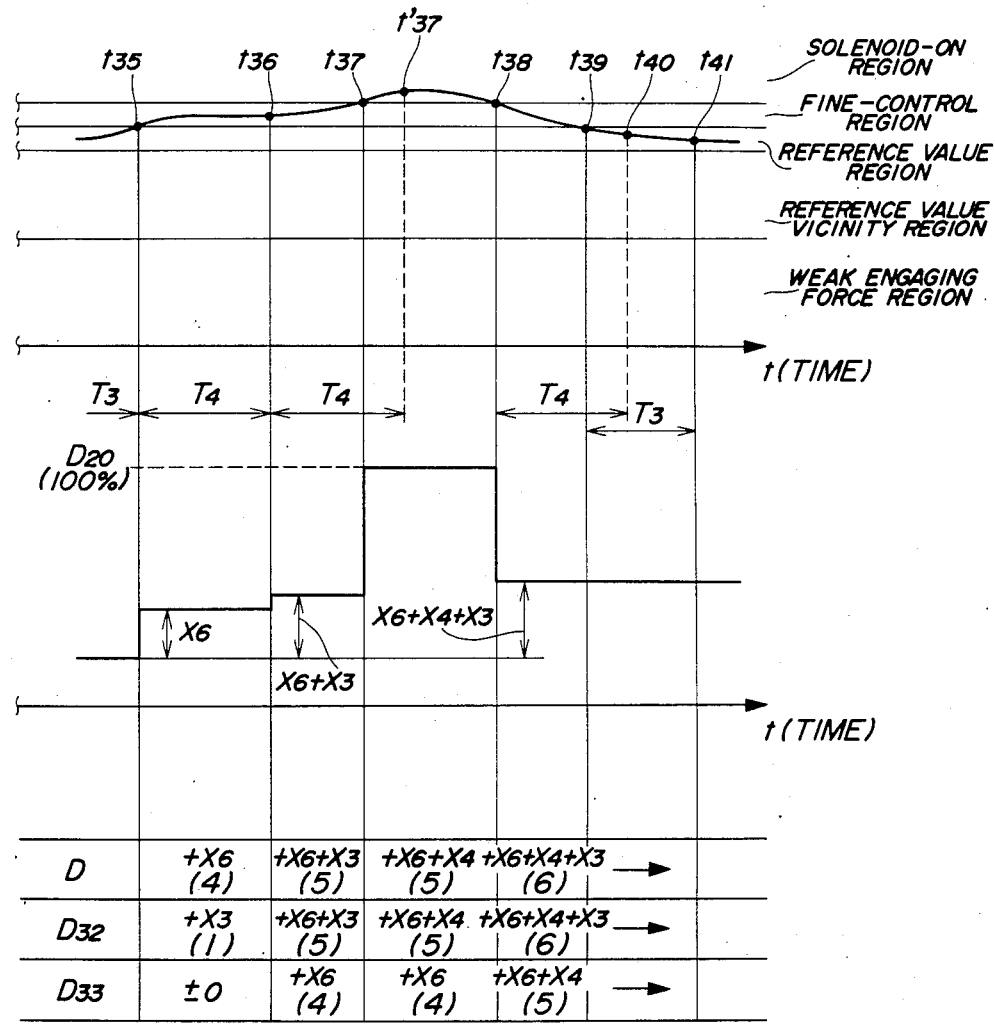
FIG. 11 is a schematic diagram illustrating how FIGS. 11a and 11b link together to form the entire graph.
Figure 11:
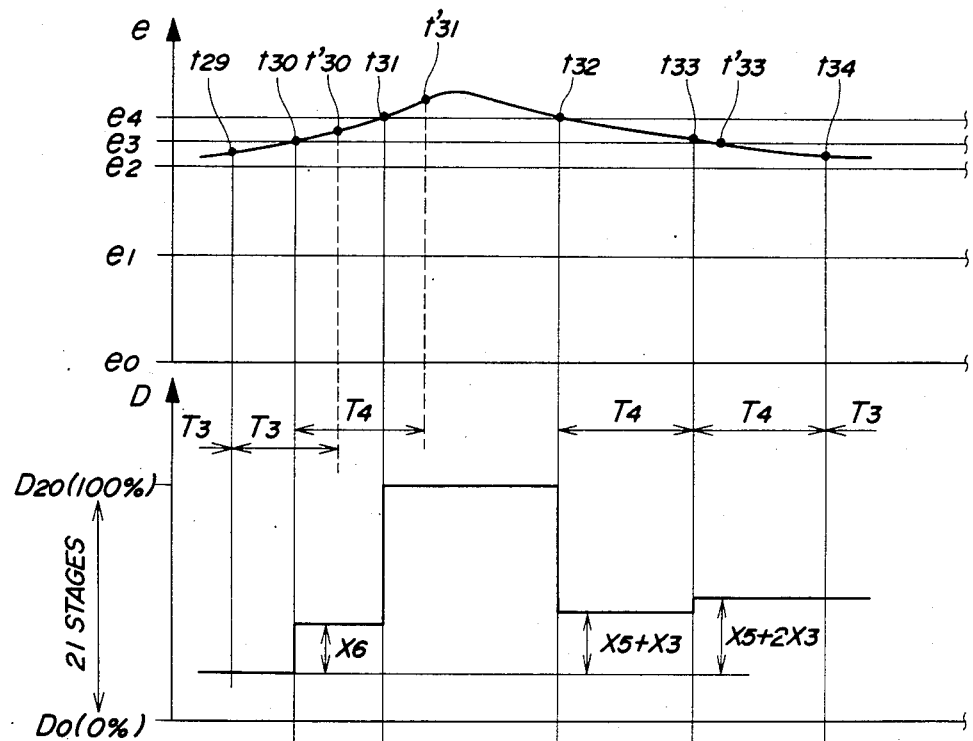

FIG. 11 shows a manner of duty ratio control in the case where the rotational speed ratio e increases from the reference value region through the fine-control region and enters the solenoid-on region, and then returns to the reference value region.

(a) of FIG. 11 shows a case where the rotational speed ratio e passes the fine-control region within a short time and enters the solenoid-on region where the solenoid of the third electro magnetic valve 240 is to be energized with 100% duty, and (b) of FIG. 11 shows a case where the rotational speed ratio e stays in the fine-control region for a long time before entering the solenoid-on region. In both (a) and (b) of FIG. 11, the rotational speed ratio e being close to the upper limit value 1.0 (en), there is some fear of occurrence of vibrations of the vehicle body. To prevent this, in the solenoid-on region the duty ratio is set to the maximum value D20 (the third electromagnetic valve 240 has its solenoid 242 continuously energized to be kept open). When the rotational speed ratio e returns to the fine-control region from the solenoid-on region, the duty ratio is set so as to become greater in the case of (a) of FIG. 11 than in the case of (b) of FIG. 11.

In (a) of FIG. 11, when the rotational speed ratio e increases from t29 to enter the fine-control region at t30, the answer to the question of step 2 in FIG. 7 becomes Yes, and then, in a manner similar to that explained with reference to FIG. 10, the program executes steps 29 through 34. On this occasion, the value of D is increased by X6 (e.g. 4) from its previous value and D33 unchanged.

In the next loop, the program executes steps 29, 30, 35, and 36. At step 36 the variable D32 is set to a value which is the sum of D33 and X3 (e.g. 1). At this time, flag F3 is kept at 0. If the rotational speed ratio e then enters the solenoid-on region from the fine-control region (at t30) before the timer period T4 elapses, the answer to the question of step 1 in FIG. 7, that is, whether or not the rotational speed ratio e is greater than the region-defining value e4, becomes Yes, whereupon the program proceeds to step 47 to set flag F2 to 1, and it is determined at step 48 whether or not the value of flag F3 is 1. Since as described above the rotational speed ratio e shifted from the fine-control region to the solenoid-on region with the value of flag F3 unchanged from 0, the answer to the question of step 48 is No. Then, at step 50 the variable D is set to a value which is the sum of D33 and X5 (e.g. 6). Next, at step 51 it is checked whether or not the value D is greater than the limit value DFO (=20). If the answer is Yes, then after setting the value of D to DFO at step 52, the program then proceeds to step 53, whereas if the answer is No, the program proceeds to step 53, while bypassing step 52. At step 53 the value D32 is set to the value of D (e.g. +6), which D was set at step 51, and then at step 54 the timer is set to 0. Next, at step 55 the solenoid 242 of the third electromagnetic valve 240 is continuously energized to thereby hold the electromagnetic valve 240 open, while at step 56 the duty ratio control of the third electromagnetic valve 240 is interrupted, and then the program returns to step 2 in FIG. 5.

Next, when the rotational speed ratio e returns to the fine-control region at t32 in (a) of FIG. 11, the answer to the question of step 2 in FIG. 7 becomes Yes, and the program proceeds to step 29 to set flag F1 to 1. Since flag F2 was set to 1 at step 47 in the preceding loop, the answer to the question of step 30 is No, and the program proceeds to step 35. Since the timer period was set to 0 at step 54 in the preceding loop, the answer to the question of step 35 is Yes, and then the program proceeds to step 37 to set flag F3 to 1. Then at step 38 the variable D33 is set to the value of D (+X5, i.e. +6). Then at step 39 the timer is set to the predetermined timer period T4. and at step 40 the variable D is newly set to the value D+X3 (i.e. +6+1=+7). Then at step 36 in the next loop, the variable D32 is set to the value D33+X3 (i.e. +6+1=+7).

Then, since at t33 the rotational speed ratio e is still in the fine-control region, steps 29, 30, 35, and 37 through 40 are executed. At step 38 the variable D33 is set to the value of D (+7), and at step 40 the variable D is set to the value of D+X3 (+8). Then, the answer to the question of step 35 becomes No again, and the program proceeds to step 36 where the variable D32 is set to the value of D33+X3 (+8). Next, after entering the reference value region at t'33, the rotational speed ratio e is controlled in a similar manner to that in the case of the time period between t19 and t'19 in (b) of FIG. 10. At and after time point t34, the duty ratio control is continued based on the variable D without changing the value of same as long as the rotational speed ratio e remains in the reference value region.

In the case of (b) of FIG. 11, when rotational speed ratio e enters the fine-control region at t35, steps 29 through 34 in FIG. 7 are executed in a similar manner to that at t30 in (a) of FIG. 11, and then at step 32 the variable D33 is set to the value of D32, i.e. ±0, and at step 33 the variable D is set to the value of D33+X6 (+4). At step 36 in the next loop the variable D32 is set to the value of D33+X3 (+1). Since the rotational speed ratio e is still in the fine-control region at time point t36 when the timer period T4 terminates, the program executes steps 29, 30, 35, and 37, and then proceeds to step 38 to set D33 to the value of D (+4). Then steps 39 and 40 are executed, at the latter of which the variable D is set to the value of D+X3 (+5).

When the rotational speed ratio e leaves the fine-control region and enters the solenoid-on region at t37, the answer to the question of step 1 in FIG. 7 becomes Yes, whereupon steps 47 and 48 are executed. In this case, since the rotational speed ratio e stayed in the fine-control region for a time period between t35 and t37, which covers the whole first timer period T4 and part of the second one of same, it can be regarded that the rotational speed ratio e varied gently, and flag F3 was set to 1. Therefore, the answer to the question of step 48 becomes Yes, and at step 49 the variable D is set to the value of D33+X4, i.e. +5. Next, step 51 is executed and if the answer is Yes, the program proceeds to step 52. If the answer is No, the program goes to step 53 while skipping step 52. At step 53 the variable D32 is set to +5, which is the value of D set at step 49, and then steps 53 through 56 are executed. Then the program returns to step 2 in FIG. 5.

When the rotational speed ratio e returns to the fine-control region at t38, steps 29, 30, 35, and 37 are executed, and at step 38 the variable D33 is set to the value of D (D33+X4=+5). Then, at step 40 the variable D is set to the value D+X3 (=+6).

If the rotational speed ratio e returns to the reference value region at t39 before the timer period T4 elapses, the rotational speed ratio e is controlled in a similar manner to that in the case of the time period between t12 and t13 (a) of in FIG. 10. After time point t41 is reached via t40, the duty ratio control is continued based on the variable D without changing the value of same as long as the rotational speed ratio e remains in the reference value region.

Incidentally, the step 4 for determining whether or not F1=1 at step 4 in FIG. 7 is provided in order to ensure that if the rotational speed ratio e, after entering the fine-control region from the reference value region in the preceding loop, is sharply decreased down to the reference value vicinity region past the reference value region during the present loop, the duty ratio control should be conducted based on the value D which was set when the rotational speed ratio e was in the fine-control region in the preceding loop since flap F2 then assumes 1. Steps 41 through 46 are for limit checks, where it is determined whether or not the respective variables D, D32, and D33 are greater than DFO (e.g. 20), and if so such variables are set to the value of DFO.

As described above, according to the first embodiment of the invention, the electronic control system 33 controls the duty ratio or valve opening period of the third electromagnetic valve 240 in a manner such that the rotational speed ratio e (or a predetermined parameter value) representative of the relative slip amount between the input and the output members of the torque converter T is brought into the reference value region, which is one of five regions defined by region-defining values e1 through e4, and further, if the mode selector switch 33a assumes the position for the economy mode, which gives priority to curtailment of fuel consumption, during the duty ratio control, then the region-defining values e1 through e4 are set at higher values than values set when the power mode is selected, which gives priority to output power, and consequently, during the economy mode fuel consumption is curtailed, and during the power mode output power characteristic is improved.

Although the foregoing first embodiment is applied to an automatic transmission in which a hydraulic torque converter is employed as the hydraulic power transmission means, the present invention may be applied to any other type automatic transmission for automotive vehicles provided with a different type fluid coupling.

Further, the difference in the rotational speed between the input and output members of the hydraulic power transmission means may be used as the predetermined parameter representing the amount of relative slip between the input and output members thereof, instead of the rotational speed ratio applied in the foregoing embodiment.

Further, although in the first embodiment the power-/economy mode selector switch 33a is provided on the dashboard and the reference value region (target value) for the rotational speed ratio e is set in response to the position assumed by the mode selector switch 33a, this is not limitative to the invention, but it is also possible to divide the D4 position into an economy mode position and a power mode position, to be selected by the shift lever of the manual valve Vm, for instance, so that the power mode or the economy mode can be selected by selective operation of the shift lever.

Figure 12:
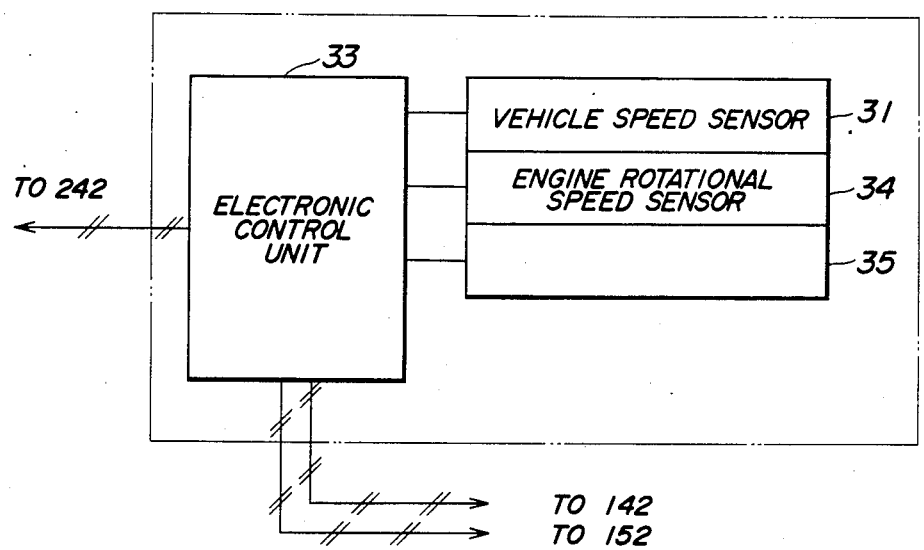
FIG. 12 is a fragmentary circuit diagram showing an electronic control unit and sensors of a hydraulic control system according to a second embodiment of the method of the invention which is applied to the automatic transmission of FIG. 1.
Figure 13:
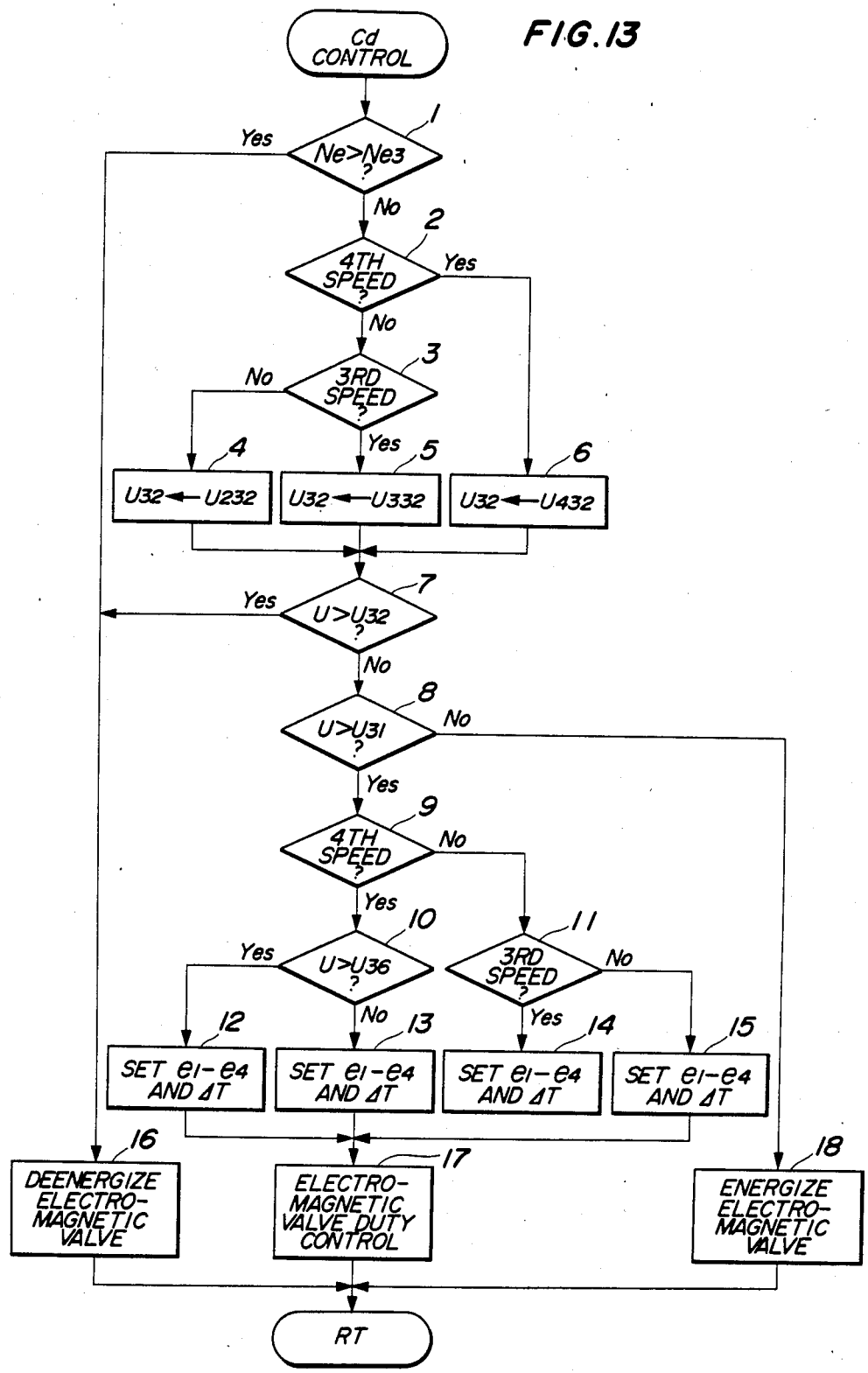
FIG. 13 is a sub-flowchart similar to that in FIG. 6, according to the second embodiment of the invention.

Referring next to FIGS. 12 and 13, a direct-coupling mechanism control method according to a second embodiment of the invention will be described.

FIG. 12 shows an electronic control unit 33 and sensors connected thereto, of the hydraulic control system according to the second embodiment, which is also applicable to the automatic transmission of FIG. 1. The electronic control unit 33 is connected to a hydraulic control circuit (not shown) similar to the circuit shown in FIG. 2.

According to the second embodiment of the direct-coupling mechanism control method, the rate ($\Delta T$, referred to later) at which the transmission capacity (engaging force) of the direct-coupling clutch Cd is controlled such that the rotational speed ratio e between the input and output means of the torque converter T varies toward the reference value region as shown in FIGS. 9–11 is determined based on the reduction ratio or speed change gear position of an automatic transmission, in lieu of the shift lever position as employed in the first embodiment.

In FIG. 12, a reduction ratio sensor 35' supersedes the shift lever position sensor 35 and the mode selector switch 33a appearing in FIG. 2, and is connected to the input side of the electronic control unit 33. The reduction ratio sensor 35' is disposed to detect the reduction ratio or speed change gear position and output a signal representing the detected reduction ratio.

According to the direct-coupling mechanism control method of the second embodiment, like the first embodiment, the electronic control unit 33 shown in FIG. 12 controls the duty ratio or valve opening period of the third electromagnetic valve 240 by the use of correction values corresponding to 21 stages provided between the operating oil pressure curves I and IV, and the same main flowchart as shown in FIG. 5 can be employed for execution of the duty ratio control of the second embodiment. According to the second embodiment, the CPU of the electronic control unit 33 reads in respective input data from the vehicle speed sensor 31, the engine rotational speed sensor 34, the reduction ratio or speed change gear position sensor 35', etc. at step 2 of the main flowchart shown in FIG. 5.

At step 5 of the main flowchart in FIG. 5 a routine for controlling the direct-coupling clutch Cd (Cd CONTROL) shown in FIG. 13 is executed. This control routine shown in FIG. 13 differs from that of the first embodiment shown in FIG. 6 only in steps 2, 3, 9, and 10 through 15.

At step 2 it is determined whether or not the reduction ratio assumed by speed change gears of the auxiliary transmission M is the fourth speed ratio, and at step 3 it is determined whether or not the reduction ratio is the third speed ratio. At step 9 it is determined whether or not the reduction ratio is the fourth speed ratio.

At step 10 it is determined whether or not the vehicle speed U is higher than a predetermined value U36 (e.g. 58 km/h), and if the answer is Yes, that is, if the fourth speed reduction ratio is assumed and at the same time the vehicle speed U is higher than the predetermined value U36, the program executes the step 12 to set region-defining values e1 through e4, e.g. e1 to 92%, e2 to 97%, e3 to 99.5%, and e4 to 102%, respectively, and also to set the timer period values T1, T2, T3, T4 which determine the transmission capacity control speed or rate $\Delta T$, and duty ratio correction values X1, X2, X3, X4, X5, X6, etc. Here, the values T1, T2, T3, and T4 are set to, e.g. 0.2 sec, 1 sec, 2 sec, and 0.4 sec, respectively, and also the values X1, X2, X3, X4, X5, and X6 are set to, e.g. 1, 1, 1, 0, 6, and 4, respectively.

If the answer to the question of step 10 is No, that is, if the fourth speed reduction ratio is assumed and at the same time the vehicle speed U is lower than the predetermined value U36, the program executes the step 13 to set the region-defining values e1 through e4, for instance, to 88%, 94%, 97.5%, and 99%, respectively, and also to set the timer period values T1 through T4, and duty ratio correction values X1 through X6, etc. Here, the values T1, T2, T3, and T4 are set to, e.g. 0.4 sec, 2 sec, 2 sec, and 0.4 sec, respectively, and also the values X1, X2, X3, X4, X5, and X6, are set to, e.g. 1, 1, 1, 0, 5, and 3, respectively.

If the answer to the question of step 9 is No, that is, if the the fourth speed reduction ratio is not assumed, then the program proceeds to step 11 to determine whether or not the third speed reduction ratio is assumed. If the answer at step 11 is Yes, that is, if the third speed reduction ratio is assumed, the program proceeds to step 14 to set the region-defining values e1 through e4, for instance, to 83%, 91%, 95.5%, and 98%, respectively, and also to set the timer period values T1 through T4, and duty ratio correction values X1 through X6, etc. Here, the values T1, T2, T3, and T4 are set to, e.g. 0.1 sec, 0.5 sec, 2 sec, and 0.5 sec, respectively, and also the values X1, X2, X3, X4, X5, and X6, are set to, e.g. 1, 1, 1, 1, 4, and 3, respectively.

If the answer to the question of step 11 is No, that is, neither the fourth speed nor the third speed reduction ratio is assumed, the program proceeds to step 15 to set the region-defining values e1 through e4, for instance, to 83%, 90%, 94.5%, and 97%, respectively, and also to set the timer period values T1 through T4, and duty ratio correction values X1 through X6, etc. Here, the values T1, T2, T3, and T4 are set to, e.g. 0.1 sec, 0.5 sec, 2 sec, and 1 sec, respectively, and also the values X1, X2, X3, X4, X5, and X6 are set to, e.g. 2, 2, 1, 1, 3, and 2, respectively. The transmission capacity control speed $\Delta T$, which is set at steps 12 through 15, is calculated from X1/T1, X2/T2, etc. when the transmission capacity is being increased, and the value $\Delta T$ becomes smaller as a higher (e.g. fourth speed) reduction ratio is assumed. Since the higher the reduction ratio is assumed, the more the vehicle body is liable to generate vibrations as the rotational speed ratio e approaches 1, it is necessary to prevent the ratio e from becoming 1 when a high reduction ratio is assumed. Especially, when the transmission capacity is increased from a value corresponding to a low rotational speed ratio e, vehicle body vibrations can take place if the control speed $\Delta T$ is high. On the other hand, at the third or a lower speed reduction ratio, even if the ratio e momentarily becomes 1, there is almost no fear of vehicle body vibrations, and therefore fuel consumption can be curtailed without causing vibrations and noise by quickly increasing the transmission capacity. Further, the output power characteristic can also be improved by reducing the speed or rate at which the transmission capacity is increased, as a higher reduction ratio is assumed, since the time period during which the engine rotational speed Ne is high is lengthened. The value to which ΔT is set at step 12 is greater than that to which ΔT is set at step 13. This is because when the fourth speed reduction ratio is assumed and at the same time the vehicle speed is higher than U36, the possibility of incurring vehicle body vibrations due to increase of the transmission capacity is small even at a higher transmission capacity control speed, which permits increasing the transmission capacity control speed to thereby improve the fuel consumption.

After setting the region-defining values e1 through e4, the timer period values T1 through T4, and the duty ratio correction values X1 through X6 at steps 12–15, the program proceeds to step 17 to execute, in a manner similar to the first embodiment, a routine for controlling the duty ratio of the electromagnetic valve 240 shown in FIG. 7 (Electromagnetic Valve Duty Control).

Therefore, according to the second embodiment of the invention, irrespective of which one of the situations represented by FIGS. 8 through 11 may hold, the electronic control unit 33 controls the duty ratio or valve opening period of the third electromagnetic valve 240 based upon the FIG. 7 flowchart such that the rotational speed ratio e (or a predetermined first parameter value) representing the relative slip amount between the input and the output members of the torque converter T is brought into the reference value region, which is one of the five regions defined by the region-defining values e1 through e4. And at the same time, during this duty ratio control, such variables as the timer period values T1 through T4 and the duty ratio correction values X1 through X6, which determine the ΔT, i.e. the transmission capacity control speed, as well as the region-defining values e1 through e4 are set based on the reduction ratio (a second predetermined parameter representing the operation mode of the vehicle) detected by the reduction ratio or speed change gear position sensor 35′.

Therefore, even if the maximum transmission capacity of the direct-coupling mechanism is set at a relatively high value, it is possible to control the transmission capacity to a value within the reference value (target value) region reliably and promptly without causing hunting in the torque converter, resulting in that the vibrations and noise of the vehicle body are mitigated enough to make the driver feel comfortable, as well as that fuel consumption and power transmission characteristic are improved.

In the second embodiment, the transmission capacity control speed ΔT may be determined in response to the shift position assumed by the shift lever (selector lever) in lieu of the reduction ratio. In such alternative, the program may be adapted to determine at steps 2 and 9 in FIG. 13 whether or not the shift lever assumes the D4 position, and at steps 3 and 11 whether or not the shift lever assumes the D3 position, and also a shift lever position sensor should be employed to supersede the reduction ratio sensor 35′ shown in FIG. 12.

What is claimed is:

1. A method of controlling a direct-coupling mechanism of hydraulic power transmission means having an input member and an output member, of an automatic transmission for an automotive vehicle, said direct-coupling mechanism being operable to mechanically engage and disengage said input member and said output member with and from each other, said automatic transmission having selector means being operatable at human will to select among a plurality of operating modes in which said automotive vehicle is to be operated, wherein the transmission capacity of said direct-coupling mechanism is controlled such that the value of a first predetermined parameter indicative of an amount of relative slip between said input member and said output member lies within a predetermined reference range, the method comprising the steps of: (1) detecting the value of a second predetermined parameter indicative of one of said operating modes selected by said selector means; and (2) determining said predetermined reference range of the value of said first predetermined parameter in dependence on the detected value of said second predetermined parameter.

2. A method as claimed in claim 1, wherein said first predetermined parameter is the ratio in rotational speed between said input member and said output member.

3. A method as claimed in claim 1 wherein said first predetermined parameter is the difference in rotational speed between said input member and said output member.

4. A method as claimed in claim 1, wherein said selector means comprises a two-position selecting means adapted to selectively assume a first position and a second position and produce a signal indicative of one of said first and second positions assumed as the value of said second predetermined parameter.

5. A method as claimed in claim 4, wherein said predetermined reference range of the value of said first predetermined parameter is set to a range corresponding to a smaller amount of relative slip between said input member and said output member when said first position is assumed than when said second position is assumed.

6. A method as claimed in claim 1, wherein said automatic transmission has speed change gears, and said selector means comprises a manual shift valve for selectively assuming a plurality of shift positions each determining a respective range of reduction ratio that can be established by said speed change gears and producing a signal indicative of one of said shift positions assumed as the value of said second predetermined parameter.

7. A method as claimed in claim 1, wherein said predetermined reference range of the value of said first predetermined parameter is set to a range correseonding to a smaller amount of relative slip between said input member and said output member when a higher speed range shift position is assumed as one of said shift positions than when a lower speed range shift position is assumed.

8. A method of controlling a direct-coupling mechanism of hydraulic power transmission means having an input member and an output member, of an automatic transmission for an automotive vehicle, said direct-coupling mechanism being operable to mechanically engage and disengage said input member and said output member with and from each other, said automotive vehicle being adapted to operate in a plurality of operating modes, wherein the transmission capacity of said direct-coupling mechanism is controlled such that the value of a predetermined parameter indicative of an amount of relative slip between said input member and said output member lies within a predetermined reference range, the method comprising the steps of: (1) detecting the value of a second predetermined parameter indicative of one of said operating modes in which said automotive vehicle is operating; and (2) determining a rate at which said transmission capacity is controlled such that the value of said first predetermined parameter changes toward said predetermined reference range, in dependence on the detected value of said second predetermined parameter.

9. A method as claimed in claim 8, wherein said first predetermined parameter is the ratio in rotational speed between said input member and said output member.

10. A method as claimed in claim 8, wherein said first predetermined parameter is the difference in rotational speed between said input member and said output member.

11. A method as claimed in claim 8, wherein said automatic transmission has speed change gears, and said second predetermined parameter is indicative of a plurality of shift positions each determining a respective speed reduction ratio established by said speed change gears.

12. A method as claimed in claim 8, wherein said automatic transmission has speed change gears, and said second predetermined parameter is indicative of a plurality of shift positions each determining a respective range of reduction ratio that can be established by said speed change gears.

* * * * *